United States Patent
Wang et al.

(10) Patent No.: US 11,582,031 B2
(45) Date of Patent: Feb. 14, 2023

(54) QUANTUM KEY DISTRIBUTION AND MANAGEMENT IN PASSIVE OPTICAL NETWORKS

(71) Applicant: CABLE TELEVISION LABORATORIES, INC., Louisville, CO (US)

(72) Inventors: Jing Wang, Broomfield, CO (US); Bernardo Huberman, Palo Alto, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 224 days.

(21) Appl. No.: 17/073,207

(22) Filed: Oct. 16, 2020

(65) Prior Publication Data
US 2021/0119788 A1   Apr. 22, 2021

Related U.S. Application Data

(60) Provisional application No. 62/928,118, filed on Oct. 30, 2019, provisional application No. 62/916,553, (Continued)

(51) Int. Cl.
*H04L 9/08* (2006.01)
*G06N 10/00* (2022.01)
(Continued)

(52) U.S. Cl.
CPC ............ *H04L 9/0855* (2013.01); *G02F 1/313* (2013.01); *G06N 10/00* (2019.01); *H04B 10/50* (2013.01);
(Continued)

(58) Field of Classification Search
CPC ........ G06N 10/00; G02F 1/313; H04B 10/50; H04B 10/66; H04B 10/70; H04L 9/0819; H04L 9/083; H04L 9/0894
(Continued)

(56) References Cited

U.S. PATENT DOCUMENTS

2006/0136714 A1    6/2006  Yagi et al.
2008/0031459 A1    2/2008  Voltz et al.
(Continued)

FOREIGN PATENT DOCUMENTS

EP    2164189 A1 *  3/2010   ............ H04B 10/03
EP    3432509 A1    1/2019
(Continued)

OTHER PUBLICATIONS

Chen et al; Metropolitan all-pass and inter-city quantum communication network; Dec. 2010; Optical society of America; pp. 1-9. (Year: 2010).*
Luo et al; Time Synchronization over Ethernet Passive Optical Networks; Oct. 2012; IEEE; pp. 1-7. (Year: 2012).*
(Continued)

*Primary Examiner* — Amritbir K Sandhu
(74) *Attorney, Agent, or Firm* — David Daniel Smith

(57) ABSTRACT

Methods, systems, and devices for quantum key distribution (QKD) in passive optical networks (PONs) are described. A PON may be a point-to-multipoint system and may include a central node in communication with multiple remote nodes. In some cases, each remote node may include a QKD transmitter configured to generate a quantum pulse indicating a quantum key, a synchronization pulse generator configured to generate a timing indication of the quantum pulse, and filter configured to output the quantum pulse and the timing indication to the central node via an optical component (e.g., an optical splitter, a cyclic arrayed waveguide grating (AWG) router). The central node may receive the timing indications and quantum pulses from multiple remote nodes. Thus, the central node and remote nodes may be configured to communicate data encrypted using quantum keys.

18 Claims, 15 Drawing Sheets

Related U.S. Application Data filed on Oct. 17, 2019, provisional application No. 62/916,562, filed on Oct. 17, 2019.

(51) Int. Cl.
*H04B 10/70* (2013.01)
*H04B 10/66* (2013.01)
*G02F 1/313* (2006.01)
*H04B 10/50* (2013.01)
*H04B 10/27* (2013.01)

(52) U.S. Cl.
CPC ............. *H04B 10/66* (2013.01); *H04B 10/70* (2013.01); *H04L 9/083* (2013.01); *H04L 9/0819* (2013.01); *H04L 9/0894* (2013.01); *G02F 2201/30* (2013.01); *H04B 10/27* (2013.01)

(58) Field of Classification Search
USPC ......................................................... 380/256
See application file for complete search history.

(56) References Cited

U.S. PATENT DOCUMENTS

| | | | |
|---|---|---|---|
| 2009/0316910 A1* | 12/2009 | Maeda | ................. H04L 9/0891 380/279 |
| 2012/0177201 A1* | 7/2012 | Ayling | ................. H04L 9/0858 380/278 |
| 2017/0338951 A1 | 11/2017 | Fu et al. | |

FOREIGN PATENT DOCUMENTS

| | | | | | |
|---|---|---|---|---|---|
| JP | 2007288694 A | * | 11/2007 | .......... | H04L 9/0852 |
| JP | 2012080229 A | * | 4/2012 | | |
| WO | WO-2011134507 A1 | * | 11/2011 | .......... | H04J 14/0257 |
| WO | 2016073552 A1 | | 5/2016 | | |

OTHER PUBLICATIONS

Elboukhari, Mohamed et al. "Integration of Quantum Key Distribution in the TLS Protocol." IJCSNS International Journal of Computer Science and Network Security, vol. 9. No. 12, (2009). (Year: 2009).

\* cited by examiner

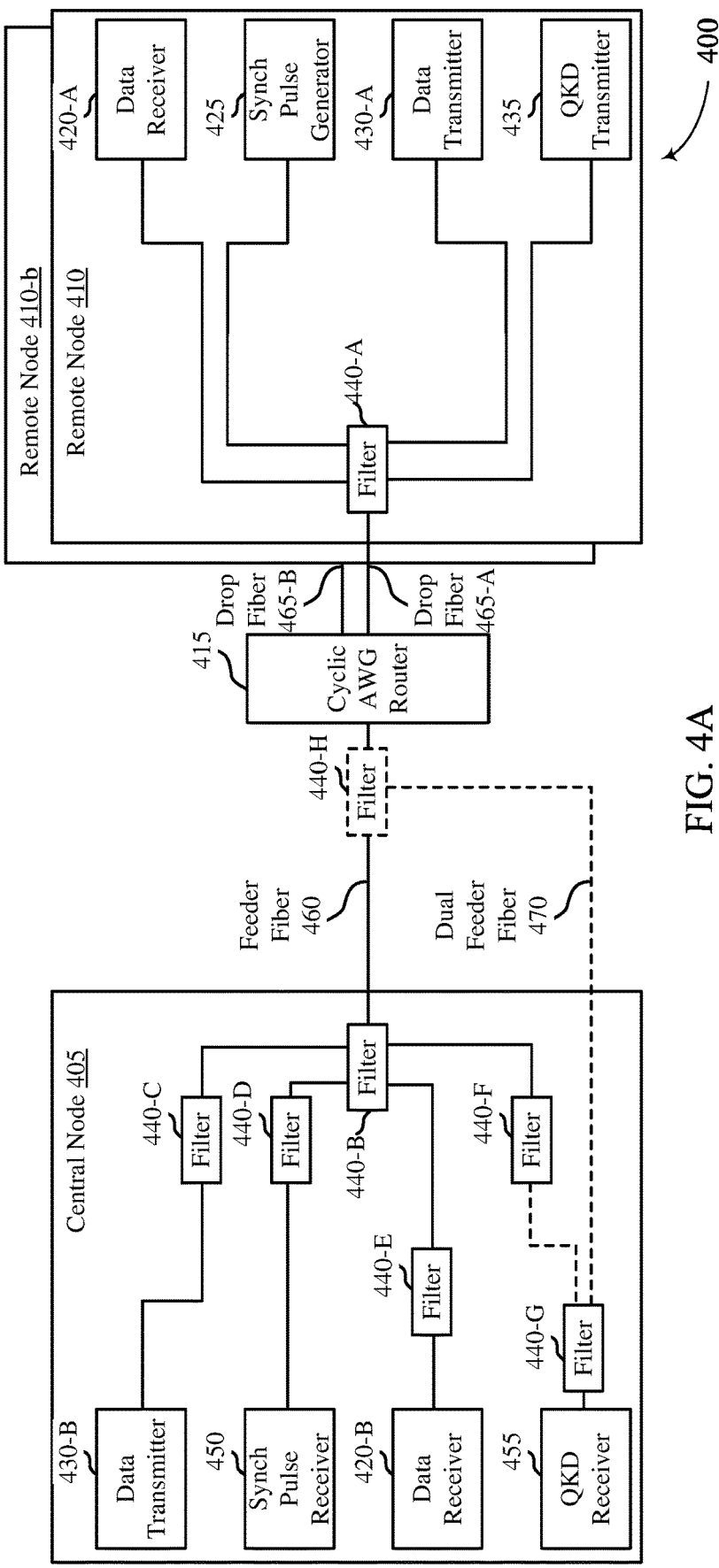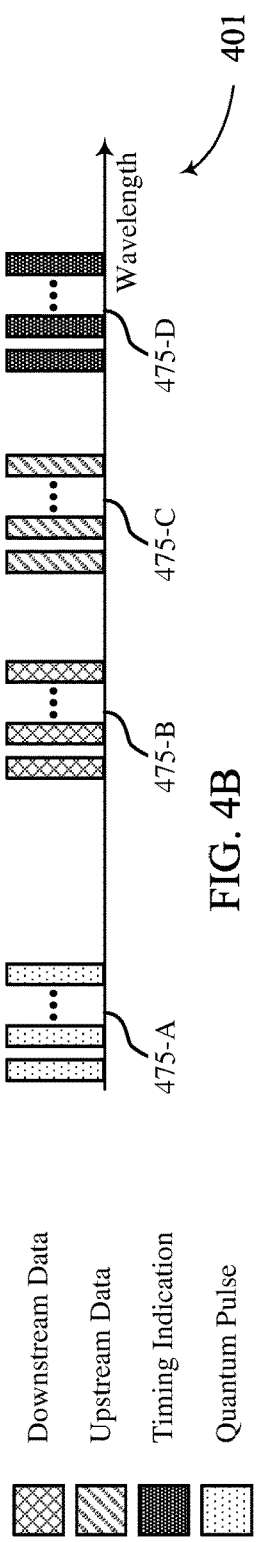
FIG. 4A
FIG. 4B

QUANTUM KEY DISTRIBUTION AND MANAGEMENT IN PASSIVE OPTICAL NETWORKS

RELATED APPLICATIONS

This present Application for Patent claims the benefit of U.S. Provisional Patent Application No. 62/916,553 by Huberman et al., entitled "METHOD FOR CREATING A PROVABLE SECURE TRANSPORT LAYER (TLS) USING QUANTUM KEY DISTRIBUTION," filed Oct. 17, 2019, U.S. Provisional Patent Application No. 62/928,118 by Huberman et al., entitled "METHOD FOR CREATING A PROVABLE SECURE TRANSPORT LAYER (TLS) USING QUANTUM KEY DISTRIBUTION (QKD) AND QKD-TLS KEY MANAGEMENT," filed Oct. 30, 2019, and U.S. Provisional Patent Application No. 62/916,562 by Wang et al., entitled "SYSTEMS AND METHODS TO INTEGRATE QUANTUM KEY DISTRIBUTION INTO PASSIVE OPTICAL NETWORKS," filed Oct. 17, 2019. Each of these applications are assigned to the assignee hereof, and expressly incorporated by reference herein in their entirety.

BACKGROUND

The field of the disclosure relates to quantum keys and more specifically to quantum key distribution (QKD) in passive optical networks (PONs).

PONs may include fiber-optic telecommunications technology for delivering broadband network access to end-customers. Additionally, PONs may implement point-to-multipoint topology, where a central node may serve multiple remote nodes by optical fibers using unpowered (e.g., passive) fiber optic components (e.g., optical splitters, wavelength multiplexers) to divide the fiber bandwidth among the multiple remote nodes. In some cases, a portion of the optical fiber coupling the central node with the multiple remote nodes may bottleneck a data capacity (e.g., a user capacity), decrease a speed of communications (e.g., introduce latency), or otherwise negatively affect a user experience. Additionally, the portion of the optical fiber coupling the central node with the multiple remote nodes may be vulnerable to security threats. That is, a cyber-attack may rely on the broadcast nature of the portion of the optical fiber to eavesdrop on unsecure communication of user data.

SUMMARY

The described techniques relate to improved methods, systems, devices, or apparatuses that support quantum key distribution (QKD) in passive optical networks (PONs). Generally the described techniques provide for distributing quantum keys to encrypt communications between a central node and one or more remote nodes (e.g., within a PON). That is, each of the one or more remote nodes may be coupled with the central node via a classical channel (e.g., for transmitting data) and a QKD channel (e.g., for transmitting quantum keys). In some cases, the classical channel and the QKD channel may rely on a same optical fiber. The remote nodes may each include a QKD transmitter for transmitting the quantum keys. Additionally, the central node may include a QKD receiver for receiving the quantum keys. In some examples, the remote nodes may communicate with the central node according to time division multiplexing. Here, a remote node may communicate a quantum key with the central node via a set of resources that are time division multiplexed with resources associated with one or more other remote nodes communicating with the central node. In another example, the remote nodes may communicate with the central node according to wavelength division multiplexing. Here, a remote node may communicate a quantum key with the central node via a set of resources that are wavelength division multiplexed with resources associated with one or more other remote nodes communicating with the central node. In either example, each of the remote nodes may transmit a quantum key to the central node for encrypting communications between the central node and the remote node. The central node and each of the one or more remote nodes may then communicate encrypted data based on the quantum keys.

Transport layer security (TLS) is a protocol used in networks (e.g., the Internet) for secure data transmissions. Enhancing TLS to support quantum keys as a basis for symmetric encryption and decryption of information may keep the information theoretically or provably secure from eavesdropping parties. Supporting quantum keys in TLS may include a key distribution layer to exchange quantum keys among nodes of the network connected via quantum channels to enable quantum secure communications among each of the nodes, even when not connected directly by a quantum channel. In some instances, a first network node may receive a quantum key from a second network node (e.g., for encrypting communications between the first network node and the second network node) by a QKD client at the first network node. The QKD client may be separate from a protocol stack of the first network node and the QKD client may then transfer the quantum key to an encryption protocol (e.g., TLS protocol) within the protocol stack of the first network node. The first network node may then rely on the quantum key to encrypt and decrypt communications with the second network node. In some cases, the first network node may additionally be configured to exchange secure communications with a third network node using a fourth quantum key. For example, the first network node may receive a second quantum key from the second network node derived from a third quantum key used for communications between the second network node and a third network node, and derive the third quantum key from the first quantum key and the second quantum key. The first network node may then exchange secure communications with the third network node using the fourth quantum key derived from the first key and the second key.

An apparatus configured for optical communications with a central node configured for communications with a set of remote nodes via an optical component coupled with the central node and the set of remote nodes, the set of remote nodes including the apparatus is described. The apparatus may include a QKD transmitter configured to identify resources from a set of resources shared by the set of remote nodes for outputting a quantum pulse indicating a quantum key for optical communications associated with the apparatus, and generate the quantum pulse based at least in part on the identifying. The apparatus may additionally include a synchronization pulse generator configured to generate a timing indication of the quantum pulse indicating the quantum key and a filter coupled with the QKD transmitter and the synchronization pulse generator and configured to output, to the optical component, the timing indication of the quantum pulse and the quantum pulse indicating the quantum key using the identified resources.

In some examples of the apparatus, the identified resources for outputting the quantum pulse are time division multiplexed with resources from the set of resources that are associated with the set of remote nodes, and the optical component is an optical splitter.

In some examples of the apparatus, the identified resources for outputting the quantum pulse are wavelength division multiplexed with resources from the set of resources that are associated with the set of remote nodes, and the optical component is cyclic arrayed waveguide grating (AWG) router.

In some cases, the apparatus may additionally include an optical switch that is configured to selectively couple the filter with the QKD transmitter and the synchronization pulse generator or couple the filter with a data transmitter and a data receiver.

In some instances, the apparatus may additionally include a data transmitter coupled with the filter and configured to identify data for transmission to the central node, encrypt, using the quantum key, the data for transmission to the central node, and communicate the encrypted data to the filter, where the filter is further configured to output the encrypted data to the optical component.

In some examples of the apparatus, the filter is further configured to receive encrypted data from the optical component, and the apparatus further includes a data receiver coupled with the filter and configured to decrypt the encrypted data using the quantum key.

In some cases of the apparatus, the filter is a course wavelength division multiplexer (CWDM).

A method at a remote node for optical communications with a central node that is configured for communications, via an optical component, with a set of remote nodes including the remote node is described. The method may include identifying, from a set of resources shared by the set of remote nodes, resources for outputting a quantum pulse indicating a quantum key for optical communications between the remote node and the central node, generating the quantum pulse and a timing indication of the quantum pulse based on identifying the resources, outputting, to the optical component, the timing indication of the quantum pulse, outputting, to the optical component using the identified resources, the quantum pulse indicating the quantum key based on outputting the timing indication of the quantum pulse, and communicating with the central node based on outputting the quantum pulse indicating the quantum key.

An apparatus at a remote node for optical communications with a central node that is configured for communications, via an optical component, with a set of remote nodes including the remote node is described. The apparatus may include a processor, memory in electronic communication with the processor, and instructions stored in the memory. The instructions may be executable by the processor to cause the apparatus to identify, from a set of resources shared by the set of remote nodes, resources for outputting a quantum pulse indicating a quantum key for optical communications between the remote node and the central node, generate the quantum pulse and a timing indication of the quantum pulse based on identifying the resources, output, to the optical component, the timing indication of the quantum pulse, output, to the optical component using the identified resources, the quantum pulse indicating the quantum key based on outputting the timing indication of the quantum pulse, and communicate with the central node based on outputting the quantum pulse indicating the quantum key.

Another apparatus at a remote node for optical communications with a central node that is configured for communications, via an optical component, with a set of remote nodes including the remote node is described. The apparatus may include means for identifying, from a set of resources shared by the set of remote nodes, resources for outputting a quantum pulse indicating a quantum key for optical communications between the remote node and the central node, means for generating the quantum pulse and a timing indication of the quantum pulse based on identifying the resources, means for outputting, to the optical component, the timing indication of the quantum pulse, means for outputting, to the optical component using the identified resources, the quantum pulse indicating the quantum key based on outputting the timing indication of the quantum pulse, and means for communicating with the central node based on outputting the quantum pulse indicating the quantum key.

A non-transitory computer-readable medium storing code at a remote node for optical communications with a central node that is configured for communications, via an optical component, with a set of remote nodes including the remote node is described. The code may include instructions executable by a processor to identify, from a set of resources shared by the set of remote nodes, resources for outputting a quantum pulse indicating a quantum key for optical communications between the remote node and the central node, generate the quantum pulse and a timing indication of the quantum pulse based on identifying the resources, output, to the optical component, the timing indication of the quantum pulse, output, to the optical component using the identified resources, the quantum pulse indicating the quantum key based on outputting the timing indication of the quantum pulse, and communicate with the central node based on outputting the quantum pulse indicating the quantum key.

In some examples of the method, apparatuses, and non-transitory computer-readable medium described herein, the identified resources for outputting the quantum pulse may be time division multiplexed with resources from the set of resources that may be associated with the set of remote nodes, and the optical component may be an optical splitter.

In some examples of the method, apparatuses, and non-transitory computer-readable medium described herein, the identified resources for outputting the quantum pulse may be wavelength division multiplexed with resources from the set of resources that may be associated with the set of remote nodes, and the optical component may be cyclic AWG router.

Some examples of the method, apparatuses, and non-transitory computer-readable medium described herein may further include operations, features, means, or instructions for generating a second quantum pulse indicating a second quantum key for optical communications between the remote node and the central node, and outputting, to the optical component after outputting the quantum pulse to the optical component, the second quantum pulse indicating the second quantum key based on outputting the timing indication, where the timing indication indicates a timing of the quantum pulse and the second quantum pulse.

In some examples of the method, apparatuses, and non-transitory computer-readable medium described herein, identifying resources for outputting the quantum key may include operations, features, means, or instructions for outputting, to the optical component, a request for time resources for outputting the quantum key, and receiving, from the optical component, an indication of the identified resources based on outputting the request for time resources.

Some examples of the method, apparatuses, and non-transitory computer-readable medium described herein may further include operations, features, means, or instructions for switching, from a first communication mode for communicating the quantum pulse to the central node, to a second communication mode for communicating data with the central node based on outputting the quantum pulse to the optical component, where communicating with the central node may be based on the switching.

In some examples of the method, apparatuses, and non-transitory computer-readable medium described herein, communicating with the central node may include operations, features, means, or instructions for encrypting, using the quantum key, data for transmission to the central node, and outputting the encrypted data to the optical component.

In some examples of the method, apparatuses, and non-transitory computer-readable medium described herein, communicating with the central node may include operations, features, means, or instructions for receiving encrypted data from the optical component, and decrypting, using the quantum key, the encrypted data received from the optical component.

An apparatus configured for optical communications with a set of remote nodes via an optical component coupled with the apparatus and the set of remote nodes is described. The apparatus may include a QKD receiver configured to receive, from a filter of the apparatus via a set of resources, a set of quantum pulses each indicating a quantum key for optical communications associated with one of the set of remote nodes, a synchronization pulse receiver configured to receive, from the filter, a set of timing indications each associated with one of the set of quantum pulses, where the QKD receiver is configured to receive each of the set of quantum pulses based at least in part on the set of timing indications, and the filter coupled with the QKD receiver and the synchronization pulse receiver and configured to receive, from the optical component, the set of quantum pulses and the set of timing indications, communicate the set of quantum pulses to the QKD receiver, and communicate the set of timing indications to the synchronization pulse receiver.

In some examples of the apparatus, each of the set of quantum pulses are received via resources that are time division multiplexed with the resources in the set of resources, and the optical component is an optical splitter.

In some examples of the apparatus, each of the set of quantum pulses are received via resources that are wavelength division multiplexed with resources in the set of resources, and the optical component is cyclic AWG router.

In some examples of the apparatus, the filter is configured to receive the set of quantum pulses from the optical component via a first fiber, and the filter is configured to receive the set of timing indications from the optical component via a second fiber different from the first fiber.

In some cases the apparatus may further include a gate coupled with the QKD receiver and configured to selectively couple the QKD receiver with the filter based at least in part on the set of timing indications.

In some instances the apparatus may further include an optical switch that is configured to selectively couple the filter with the QKD receiver and the synchronization pulse receiver or couple the filter with a data transmitter and a data receiver.

In some examples the apparatus may further include a narrowband optical filter coupled with the filter and the QKD receiver and configured to communicate the set of quantum pulses from the filter to the QKD receiver.

In some cases the apparatus may further include a data transmitter coupled with the filter and configured to identify data for transmission to one remote node of the set of remote nodes, encrypt, using the quantum key for optical communications associated with the one remote node, the data for transmission to the one remote node, and communicate the encrypted data to the filter, where the filter is further configured to output the encrypted data to the optical component.

In some instances of the apparatus, the filter is further configured to receive, from the optical component, encrypted data associated with one remote node of the set of remote nodes, and the apparatus further includes a data receiver coupled with the filter and configured to decrypt the encrypted data using the quantum key for optical communications associated with the one remote node.

In some examples of the apparatus, the QKD may include a single photon detector (SPD).

In some cases of the apparatus, the filter is a CWDM.

A method at a central node for optical communications with a set of remote nodes via an optical component coupled with each of the set of remote nodes. The method may include receiving, from the optical component, a set of timing indications each associated with one of a set of quantum pulses each indicating a quantum key for optical communications associated with one of the set of remote nodes, receiving, from the optical component, the set of quantum pulses via a set of resources based on receiving the set of timing indications, and communicating with the set of remote nodes based on receiving the set of quantum pulses each indicating the quantum key for optical communications associated with one of the set of remote nodes.

An apparatus at a central node for optical communications with a set of remote nodes via an optical component coupled with each of the set of remote nodes. The apparatus may include a processor, memory in electronic communication with the processor, and instructions stored in the memory. The instructions may be executable by the processor to cause the apparatus to receive, from the optical component, a set of timing indications each associated with one of a set of quantum pulses each indicating a quantum key for optical communications associated with one of the set of remote nodes, receive, from the optical component, the set of quantum pulses via a set of resources based on receiving the set of timing indications, and communicate with the set of remote nodes based on receiving the set of quantum pulses each indicating the quantum key for optical communications associated with one of the set of remote nodes.

Another apparatus at a central node for optical communications with a set of remote nodes via an optical component coupled with each of the set of remote nodes. The apparatus may include means for receiving, from the optical component, a set of timing indications each associated with one of a set of quantum pulses each indicating a quantum key for optical communications associated with one of the set of remote nodes, means for receiving, from the optical component, the set of quantum pulses via a set of resources based on receiving the set of timing indications, and means for communicating with the set of remote nodes based on receiving the set of quantum pulses each indicating the quantum key for optical communications associated with one of the set of remote nodes.

A non-transitory computer-readable medium storing code at a central node for optical communications with a set of remote nodes via an optical component coupled with each of the set of remote nodes. The code may include instructions executable by a processor to receive, from the optical component, a set of timing indications each associated with one of a set of quantum pulses each indicating a quantum key for optical communications associated with one of the set of remote nodes, receive, from the optical component, the set of quantum pulses via a set of resources based on receiving the set of timing indications, and communicate with the set of remote nodes based on receiving the set of quantum pulses each indicating the quantum key for optical communications associated with one of the set of remote nodes.

In some examples of the method, apparatuses, and non-transitory computer-readable medium described herein, each of the set of quantum pulses may be received via resources that may be time division multiplexed with the resources in the set of resources, and the optical component may be an optical splitter.

In some examples of the method, apparatuses, and non-transitory computer-readable medium described herein, each of the set of quantum pulses may be received via resources that may be wavelength division multiplexed with resources in the set of resources, and the optical component may be cyclic AWG router.

Some examples of the method, apparatuses, and non-transitory computer-readable medium described herein may further include operations, features, means, or instructions for receiving, from the optical component, a request for time resources for one of the set of quantum pulses, and outputting, to the optical component, an indication of time resource within the set of resources for the one of the set of quantum pulses, where receiving the set of quantum pulses may be based on outputting the indication.

Some examples of the method, apparatuses, and non-transitory computer-readable medium described herein may further include operations, features, means, or instructions for switching, from a first communication mode for receiving the set of quantum pulses, to a second communication mode for communicating data with the set of remote nodes based on receiving the set of quantum pulses from the optical component, where communicating with the set of remote nodes may be based on the switching.

In some examples of the method, apparatuses, and non-transitory computer-readable medium described herein, communicating with the set of remote nodes may include operations, features, means, or instructions for identifying data for transmission to one remote node of the set of remote nodes, encrypting, using the quantum key for optical communications associated with the one remote node, the data for transmission to the central node, and communicating the encrypted data to the one remote node via the optical component.

In some examples of the method, apparatuses, and non-transitory computer-readable medium described herein, communicating with the set of remote nodes may include operations, features, means, or instructions for receiving, from the optical component, encrypted data associated with one remote node of the set of remote nodes, and decrypting, using the quantum key for optical communications associated with the one remote node, the encrypted data received from the optical component.

A method at a first network node including a protocol stack and a QKD client distinct from the protocol stack is described. The method may include receiving, by the QKD client, a first quantum key and a first quantum key identifier from a second network node, transferring the first quantum key and the first quantum key identifier from the QKD client of the first network node to the protocol stack of the first network node, and communicating, by an encryption protocol of the protocol stack, encrypted data with the second network node, where the encrypted data is encrypted using the first quantum key and includes an indication of the first quantum key identifier.

An apparatus at a first network node including a protocol stack and a QKD client distinct from the protocol stack is described. The apparatus may include a processor, memory in electronic communication with the processor, and instructions stored in the memory. The instructions may be executable by the processor to cause the apparatus to receive, by the QKD client, a first quantum key and a first quantum key identifier from a second network node, transfer the first quantum key and the first quantum key identifier from the QKD client of the first network node to the protocol stack of the first network node, and communicate, by an encryption protocol of the protocol stack, encrypted data with the second network node, where the encrypted data is encrypted using the first quantum key and includes an indication of the first quantum key identifier.

Another apparatus at a first network node including a protocol stack and a QKD client distinct from the protocol stack is described. The apparatus may include means for receiving, by the QKD client, a first quantum key and a first quantum key identifier from a second network node, means for transferring the first quantum key and the first quantum key identifier from the QKD client of the first network node to the protocol stack of the first network node, and means for communicating, by an encryption protocol of the protocol stack, encrypted data with the second network node, where the encrypted data is encrypted using the first quantum key and includes an indication of the first quantum key identifier.

A non-transitory computer-readable medium storing code at a first network node including a protocol stack and a QKD client distinct from the protocol stack is described. The code may include instructions executable by a processor to receive, by the QKD client, a first quantum key and a first quantum key identifier from a second network node, transfer the first quantum key and the first quantum key identifier from the QKD client of the first network node to the protocol stack of the first network node, and communicate, by an encryption protocol of the protocol stack, encrypted data with the second network node, where the encrypted data is encrypted using the first quantum key and includes an indication of the first quantum key identifier.

Some examples of the method, apparatuses, and non-transitory computer-readable medium described herein may further include operations, features, means, or instructions for receiving, from the second network node, a message including a second quantum key derived from a third quantum key associated with communications between the second network node and a third network node, identifying the third quantum key based on the second quantum key and the first quantum key, and communicating, by the encryption protocol of the protocol stack, second encrypted data with the third network node, where the second encrypted data may be encrypted using the first quantum key and the third quantum key.

In some examples of the method, apparatuses, and non-transitory computer-readable medium described herein, transferring the first quantum key and the first quantum key identifier may include operations, features, means, or instructions for transferring the first quantum key and the first quantum key identifier from the QKD client of the first network node to a key management layer of the first network node, and storing the first quantum key and the first quantum key identifier at a server associated with the key management layer, where communicating encrypted data with the second network node may be based on the storing.

Some examples of the method, apparatuses, and non-transitory computer-readable medium described herein may further include operations, features, means, or instructions for transmitting, by a key management layer of the first network node, a request for the first quantum key to a corresponding key management layer of the second network node, where receiving the first quantum key by the QKD client of the first network node may be based on transmitting the request.

In some examples of the method, apparatuses, and non-transitory computer-readable medium described herein, communicating encrypted data with the second network node further may include operations, features, means, or instructions for identifying data for transmission to the second network node, encrypting, by the encryption protocol of the protocol stack, the data for transmission to the second network node using the first quantum key, and transmitting, by the encryption protocol of the protocol stack, the encrypted data and the indication of the first quantum key identifier to the second network node.

In some examples of the method, apparatuses, and non-transitory computer-readable medium described herein, communicating encrypted data with the second network node further may include operations, features, means, or instructions for receiving, by the encryption protocol of the protocol stack, encrypted data from the second network node, where the encrypted data includes the indication of the first quantum key identifier, retrieving, by the encryption protocol of the protocol stack, the first quantum key from a server associated with a key management layer of the first network node based on the indication of the first quantum key identifier, and decrypting, by the encryption protocol of the protocol stack, the encrypted data using the first quantum key based on retrieving the first quantum key.

A first network node is described. The first network node may include a QKD client configured to receive, from a second network node, a first quantum key and a first quantum key identifier, a protocol stack distinct from and coupled with the QKD client, where the protocol stack includes an encryption protocol configured to receive the first quantum key and the first quantum key identifier from the QKD client, and communicate encrypted data with the second network node, where the encrypted data is encrypted using the first quantum key and includes an indication of the first quantum key identifier.

In some examples of the first network node, the protocol stack is configured to receive, from the second network node, a message including a second quantum key derived from a third quantum key associated with communications between the second network node and a third network node, identify the third quantum key based at least in part on the first quantum key and the second quantum key, and communicate second encrypted data with the third network node, where the second encrypted data is encrypted using the first quantum key and the third quantum key.

In some cases of the first network node, the first network node includes a key management layer coupled with the encryption protocol, where the key management layer is configured to store the first quantum key and the first quantum key identifier at a server associated with the key management layer, provide the first quantum key and the first quantum key identifier to the encryption protocol, where communicating encrypted data with the second network node is based at least in part on the storing.

In some instances of the first network node, the first network node includes a key management layer coupled with the encryption protocol configured to transmit a request for the first quantum key, where receiving the first quantum key by the QKD client of the first network node is based at least in part on transmitting the request.

In some examples of the first network node, the encryption protocol is further configured to identify data for transmission to the second network node, encrypt the data for transmission to the second network node using the first quantum key, and transmit the encrypted data and the indication of the first quantum key identifier to the second network node, where communicating encrypted data with the second network node is based at least in part on transmitting the encrypted data and the indication of the first quantum key identifier to the second network node.

In some cases of the first network node, the encryption protocol is further configured to receive, from the second network node, encrypted data including the indication of the first quantum key identifier, where communicating encrypted data with the second network node is based at least in part on receiving the encrypted data from the second network node, retrieve the first quantum key from a server associated with a key management layer of the first network node based at least in part on the indication of the first quantum key identifier, and decrypt the encrypted data using the first quantum key based at least in part on retrieving the first quantum key.

BRIEF DESCRIPTION OF THE DRAWINGS

FIG. 4A illustrates an example of a system that supports QKD in PONs in accordance with examples as disclosed herein.

FIG. 4B illustrates an example of a wavelength plan that supports QKD in PONs in accordance with examples as disclosed herein.

DETAILED DESCRIPTION

Figure 1:
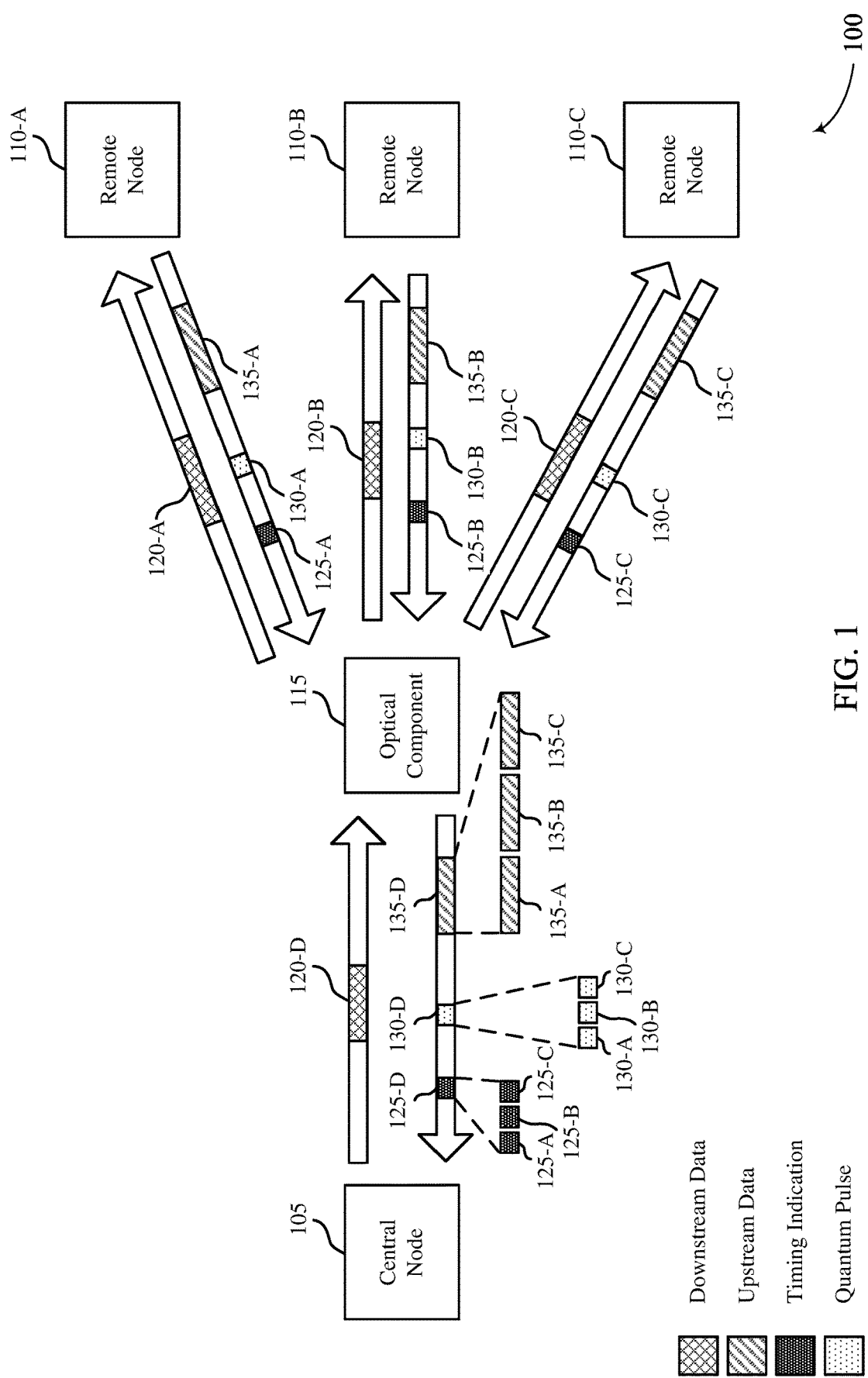
FIG. 1 illustrates an example of a system that supports quantum key distribution (QKD) in passive optical networks (PONs) in accordance with examples as disclosed herein.

A core network may be configured to provide data connectivity to one or more customers. In some cases, the core network may utilize a passive optical network (PON) to communicate data between a central node associated with the core network and one or more remote nodes (e.g., each associated with a customer). In an example of a point-to-multipoint PON, the central node may be configured to serve multiple remote nodes by optical fibers using unpowered (e.g., passive) fiber optic components (e.g., optical splitters, optical multiplexers) to divide the fiber bandwidth among the multiple remote nodes. Here, the central node may be configured to broadcast data to multiple remote nodes via a fiber optic component. In some instances, the central node and the remote nodes may encrypt data for communications in order to decrease a security risk associated with the broadcasted data. Some PONs may utilize symmetric encryption based on an advanced encryption standard (AES), which may encrypt data for each individual remote node (e.g., data for each individual user). In order for the keys to be communicated between the central and remote nodes, the PON may deliver a classical encryption key by public key infrastructure (PKI). Delivering a classical encryption key by PKI may include using asymmetric or public encryption to protect the key. However, security of classical encryption keys delivered by PKI may be vulnerable (e.g., against the advent of quantum computers).

To increase security associated with key distribution, a PON may use a quantum key distribution (QKD) (e.g., instead of a PKI). Here, a central node or remote node may utilize QKD to deliver quantum keys (e.g., by communicating various bits of logical value '0' or '1') to a different central node or a remote node. QKD may be more secure when compared to the classical ways of distributing keys. In some instances however, QKD may be sensitive to channel loss and noise, as QKD relies on single photons to carry qubits. As a result, QKD may be limited based on physical distance. For example, QKD may be relatively successful at fiber distances less than 500 kilometers and the key rate decreases as fiber distances increase. In some instances, decreasing an amount of noise from classical channels may increase a success of QKD. That is, utilizing a dedicated point-to-point fiber between a remote node and a central node for QKD may increase a success of QKD. Additionally, QKD distance may be extended (e.g., suitable for most long-haul, core, and metro area networks) by combining the dedicated point-to-point fiber with a trusted relay or satellite relay. Here, the data communicated via each hop (e.g., the communication of data from one device or node to another device or node) may be decrypted and re-encrypted, as each hop may be associated with individual keys. As a result, these options for improving a success of QKD may not be compatible with point-to-multipoint PONs (e.g., where a single central node communicates with multiple remote nodes).

In order to provide QKD for point-to-multipoint PONs, each remote node may be configured to include a quantum key transmitter to communicate a quantum key to a central node. That is, the central node may receive one or more quantum keys from various remote nodes via a single fiber and may utilize the quantum keys for secure communications with the various remote nodes. In some examples, the remote nodes may communicate with the central node according to time division multiplexing. Here, a remote node may communicate a quantum key with the central node via a set of resources that are time division multiplexed with resources associated with one or more other remote nodes communicating with the central node. In another example, the remote nodes may communicate with the central node according to wavelength division multiplexing. Here, a remote node may communicate a quantum key with the central node via a set of resources that are wavelength division multiplexed with resources associated with one or more other remote nodes communicating with the central node. In either example, each of the remote nodes may transmit a quantum key to the central node for encrypting communications between the central node and the remote node. The central node and each of the one or more remote nodes may then communicate encrypted data based on the quantum keys.

Network nodes that rely on quantum keys to encrypt data may enable the network nodes to rely on the quantum key as a basis for symmetric encryption and decryption of information. Additionally, communicating the data encrypted by quantum keys may be secure from eavesdropping parties. In some cases, a transport layer security (TLS) protocol (e.g., used in the internet for secure data transmissions) may rely on computationally difficult algorithms for symmetric encryption and decryption of information, which may less secure when compared to quantum key encryption and decryption. In some instances, a first network node may receive a quantum key from a second network node (e.g., for encrypting communications between the first network node and the second network node) by a QKD client at the first network node. The QKD client may be separate from a protocol stack of the first network node and the QKD client may then transfer the quantum key to an encryption protocol (e.g., TLS protocol) within the protocol stack of the first network node. The first network node may then rely on the quantum key to encrypt and decrypt communications with the second network node. The network nodes may additionally be configured to perform trusted relay of quantum keys. In some cases, the first network node may additionally be configured to exchange secure communications with a third network node using a fourth quantum key. For example, the first network node then receive a second key from the second network node derived from a third key used for communications between the second network node and a third network node, and derive the third key from the first key and the second key. The first network node may then exchange secure communications with the third network node using the fourth key derived from the first key and the second key.

Features of the disclosure are initially described in the context of systems and dies as described with reference to FIGS. 1-2. Features of the disclosure are described in the context systems, wavelength plans, and a process flow as described with reference to FIGS. 2A-8. These and other features of the disclosure are further illustrated by and described with reference to an apparatus diagram and flowcharts that relate to QKD in PONs as described with reference to FIGS. 9-15.

FIG. 1 illustrates an example of a system 100 that supports QKD in a PON in accordance with various aspects of the present disclosure. The system 100 may be an example of a point-to-multipoint PON system 100 configured to communicate data between a central node 105 and multiple remote nodes 110 that is encrypted using quantum keys. The system 100 may include an optical component 115, which may be an example of a power splitter or a wavelength multiplexer. Communications between the central node 105 and the optical component 115 may be via a feeder fiber and communications between the optical component 115 and each of the remote nodes 110 may be via drop fibers.

Each of the remote nodes 110 may be in communication with the central node 105 via the optical component 115 and using a set of resources. In some examples, the central node 105 may assign resources to the remote nodes 110. Additionally, one or more remote nodes 110 may transmit a request (e.g., to the central node 105) for resources and the central node 105 may assign the resources in response to the request. In some cases, the remote nodes 110 may be in communication with the central node 105 using time division multiplexing (TDM). Here, each remote node 110 may be assigned resources for communication with the central node 105 that are associated with a time slot. In the example of TDM, packets associated with communications between the central node 105 and different remote nodes 110 may be multiplexed in the time domain. When the system 100 employs TDM for communications between the remote nodes 110 and the central node 105, the system 100 may be referred to as a time division multiplexing-PON (TDM-PON). In some instances, TDM-PONs may be standardized in Ethernet PON (EPON), Gigabit PON (GPON), 10G-EPON, or XG-PON. In some other cases, the remote nodes 110 may be in communication with the central node 105 using wavelength-division multiplexing (WDM). Here, each remote node 110 may be assigned a dedicated wavelength (or wavelengths). When the system 100 employs WDM for communications between the remote nodes 110 and the central node 105, the system 100 may be referred to as a WDM-PON.

The central node 105 and the remote nodes 110 may use quantum keys to encrypt communications between the central node 105 and the remote nodes 110. That is, the central node 105 and the remote nodes 110 may use quantum keys to encrypt and decrypt both downstream data 120 and upstream data 135. For example, the remote node 110-*a* and central node 105 may use a quantum key (e.g., associated with communications between the remote node 110-*a* and the central node 105) to encrypt and decrypt communications between the central node 105 and the remote node 110-*a*. Each of the remote nodes 110-*a* may include a QKD transmitter configured to generate and transmit the quantum pulses 130 to the central node 105. Additionally, the central node 105 may include a QKD receiver configured to detect quantum pulses 130 from each of the remote nodes 110. The QKD receiver may use single photon detectors (SPDs) (e.g., two SPDs, four SPDs, eight SPDs) for detecting single photons (e.g., the quantum pulses 130).

Prior to transmitting a quantum pulse 130 to the central node 105, a remote node 110 may first communicate a timing indication 125 to the central node 105. For example, the QKD receiver at the central node 105 may be gated (e.g., may not receive and/or detect quantum pulses 130 unless the gate is open). Thus, the remote node 110 may transmit a timing indication 125 to indicate, to the central node 105, to open the gate associated with the QKD receiver to detect the subsequent quantum pulse 130. For example, the remote node 110-*a* may transmit the timing indication 125-*a* to the central node (e.g., via the optical component 115) indicating a timing associated with the quantum pulse 130-*a*. Thus, when the remote node 110-*a* transmits the quantum pulse 130-*a* (e.g., according to the timing indicated by the timing indication 125-*a*), the central node 105 may open a gate of the QKD receiver to receive and/or detect the quantum pulse 130-*a*.

In order to communicate encrypted downstream data 120 and upstream data 135 with the central node, each remote node 110 may communicate at least one timing indication 125 and at least one quantum pulse 130 to the central node 105. For example, the remote node 110-*a* may communicate the timing indication 125-*a* and the quantum pulse 130-*a* to the central node 105, the remote node 110-*b* may communicate the timing indication 125-*b* and the quantum pulse 130-*b* to the central node 105, and the remote node 110-*c* may communicate the timing indication 125-*c* and the quantum pulse 130-*c* to the central node 105. Each of the remote nodes 110 may communicate the timing indications 125 and the quantum pulses 130 to the central node 105 via the optical component 115 (e.g., by different drop fibers). The optical component 115 may by an optical splitter (e.g., if the system 100 is a TDM-PON) or a wavelength multiplexer (e.g., if the system is a WDM-PON). In either case, the optical component 115 may communicate the timing indications 125-*d* (including the timing indications 125-*a*, 125-*b*, and 125-*c*) and the quantum pulses 130-*d* (e.g., including the quantum pulses 130-*a*, 130-*b*, and 130-*c*) to the central node 105 (e.g., via a feeder fiber).

In some cases, each remote node 110 may be configured to transmit a timing indication 125 for each quantum pulse 130 transmitted by that remote node 110. In some other cases, each remote node 110 may be configured to transmit one timing indication 125 for a set of quantum pulses 130. For example, the remote node 110-*b* may transmit the timing indication 125-*b* indicating a set of quantum pulses 130-*b* transmitted by the remote node 110-*b* according to a certain periodicity (e.g., based on a condition of a classical or quantum channel between the remote node 110-*b* and the central node 105). Each remote node 110 may communicate additional timing indications 125 and quantum pulses 130 as needed to convey multiple bits of a quantum key. For example, the remote nodes 110 may update the quantum keys every several hours or days.

In a case that the system 100 is a TDM-PON, any of the timing indications 125-*a*, 125-*b*, and 125-*c* transmitted by the remote nodes 110 may be time division multiplexed within the timing indications 125-*d*. Additionally, any of the quantum pulses 130-*a*, 130-*b*, and 130-*c* transmitted by the remote nodes 110 may be time division multiplexed within the quantum pulses 130-*d*. In a case that the system 100 is a WDM-PON, any of the timing indications 125-*a*, 125-*b*, and 125-*c* transmitted by the remote nodes 110 may be wavelength division multiplexed within the timing indications 125-*d* received by the central node 105 on the feeder fiber. Additionally, any of the quantum pulses 130-*a*, 130-*b*, and 130-*c* transmitted by the remote nodes 110 may be wavelength division multiplexed within the quantum pulses 130-*d* received by the central node 105 on the feeder fiber.

In some instances, a fiber length between the central node 105 and the remote nodes 110 may result in challenges for integrating QKD into a PON (e.g., as illustrated by system 100). For example, integrating QKD into a PON may be susceptible to Raman scattering noise. Raman scattering noise may arise when multiplexing quantum channels with classical channels. That is, Raman scattering noise may arise as an inelastic scattering effect between the incident photons and the optical fiber (e.g., a feeder fiber coupling the central node 105 with the optical component 115, a drop fiber coupling the optical component 115 with the remote nodes 110). Additionally, Raman scattering noise may change not only the direction, but also the energy of scattered photons. In the optical fiber, the scattered photons may propagate in both directions, and may be defined as forward scattering and backscattering (e.g., depending on their propagation directions with respect to the incident light). In some instances, backscattering may be stronger than forward scattering (e.g., due to a higher efficiency). Additionally, photons that lose energy in the scattering (e.g., Stokes photons) may have reduced frequency and red-shifted wavelengths (e.g., when compared to photons that do not lose energy in scattering). Photons that gain energy (e.g., anti-Stokes photons) may have increased frequency and blue-shifted wavelengths. In some cases, Raman noise may cover a spectral range of up to 200 nanometers centered at the wavelength of incident light, with a peak intensity at a frequency shift of 13 THz. Because scattered photons change their wavelengths, they may become noise to existing signals at those wavelengths. Thus, Raman scattering noise from classical channels at wavelengths of quantum channels may be a dominant factor limiting a QKD distance and quantum key rate.

In some instances, there may be two wavelength bands for QKD. A first wavelength band (e.g., a C-band wavelength band ranging from 1530 nanometers to 1565 nanometers) may be associated with a lower fiber loss (e.g., 0.2 decibels (dBs) per kilometer). A second wavelength band (e.g., an O-band wavelength band ranging from 1250 nanometers to 1360 nanometers) may be associated with reduced Raman noise. In the example of system 100, the remote nodes 110 may communicate quantum pulses 130 to the central node 105 using the second wavelength band. Here, the quantum channels (e.g., used for transmitting the quantum pulses 130) may be associated with a higher fiber loss (e.g., 0.33 dB per kilometer) but lower noise (e.g., when compared to using the first wavelength band for quantum channels). That is, using the second wavelength band for the quantum channels may allow for the quantum channel to be out of the Raman spectrum of most classical channels (e.g., in the first wavelength band). Additionally, by assigning the second wavelength band to the quantum channels (e.g., a shorter wavelength band than a wavelength band associated with classical channels), the quantum channels may be associated with weaker anti-Stokes scattering (e.g., when compared to Stokes scattering). In some cases, however, a system cost associated with quantum channels at the second wavelength band may be higher (e.g., when compared to quantum channels in the first wavelength band).

After transmitting, to the central node 105, a quantum pulse 130 indicating a quantum key for communications between the central node 105 and a remote node 110, the remote node 110 may communicate data with the central node 105 that is encrypted using the quantum key. For example, the central node may transmit downstream data 120 to the remote nodes 110 that is encrypted using quantum keys and the remote nodes 110 may transmit upstream data 135 to the central node 105 that is encrypted using quantum keys.

To transmit downstream data 120 to remote nodes 110, the central node 105 may send downstream data 120-$d$ to the optical component 115. That is, the downstream data 120-$d$ may include downstream data 120 associated with each of the remote nodes 110. In an example that the system 100 is a TDM-PON, the downstream data 120-$d$ and the downstream data 120 transmitted from the optical component 115 to each of the remote nodes 110 may be the same. That is, the optical component 115 may be an optical splitter configured to split the downstream data 120-$d$ received from the central node 105 into multiple transmissions of the same downstream data 120-$a$, 120-$b$, and 120-$c$ (e.g., at a lower power than the downstream data 120-$d$), each directed to one of the remote nodes 110. Here, each remote node 110 may only decrypt the data message dedicated for that remote node 110. For example, the remote node 110-$b$ may only decrypt a subset of the downstream data 120-$b$ that is encrypted using a quantum key associated with communications between the remote node 110-$b$ and the central node 105 (e.g., indicated by the quantum pulse 130-$b$).

In an example that the system 100 is a WDM-PON, the downstream data 120-$d$ may include each of the transmissions of the downstream data 120-$a$, 120-$b$, and 120-$c$. For example, the optical component 115 may be configured to split the transmission of the downstream data 120-$d$ into the downstream data 120-$a$ associated with a first wavelength, the downstream data 120-$b$ associated with a second wavelength, and the downstream data 120-$c$ associated with a third wavelength. In either case, the remote nodes 110 may receive downstream data 120 and may use the quantum key associated with communications between that remote node 110 and the central node 105 to decrypt the downstream data 120.

Each remote node 110 may additionally be configured to transmit, to the central node 105, upstream data 135 that is encrypted using a quantum key. That is, remote node 110-$a$ may be configured to transmit upstream data 135-$a$, remote node 110-$b$ may be configured to transmit upstream data 135-$b$, and remote node 110-$c$ may be configured to transmit upstream data 135-$c$. Each of the remote nodes 110 may utilize a set of resources to transmit the upstream data 135 that may be time division multiplexed or wavelength division multiplexed with the upstream data 135 associated with the other remote nodes 110. Additionally, the optical component 115 may be configured to receive each of the upstream data 135 from the remote nodes 110 and communicate the upstream data 135-$d$ to the central node 105. In a TDM-PON system 100, the upstream data 135-$d$ may include time division multiplexed upstream data 135-$a$, 135-$b$, and 135-$c$. Additionally, in a WDM-PON system 100, the upstream data 135-$d$ may include wavelength division multiplexed upstream data 135-$a$, 135-$b$, and 135-$c$.

When the central node 105 receives the upstream data 135-$d$, the central node 105 may decrypt the upstream data 135 using the quantum keys associated with each of the remote nodes 110 communicating upstream data 135. For example, the central node 105 may use a quantum key associated with communications between the remote node 110-$c$ and the central node 105 to decrypt the upstream data 135-$c$.

Figure 2A:
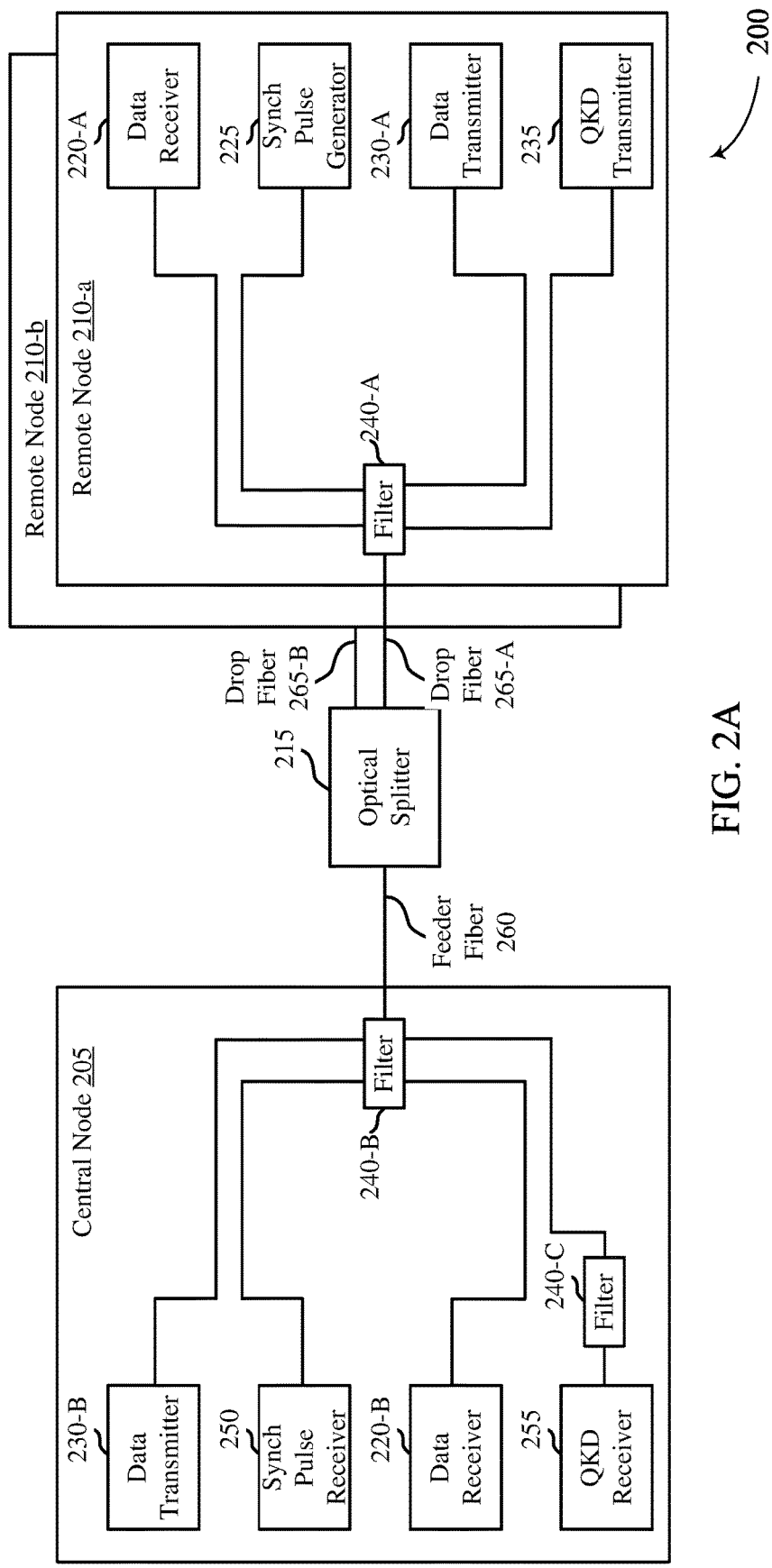
FIG. 2A illustrates an example of a system that supports QKD in PONs in accordance with examples as disclosed herein.
Figure 2B:
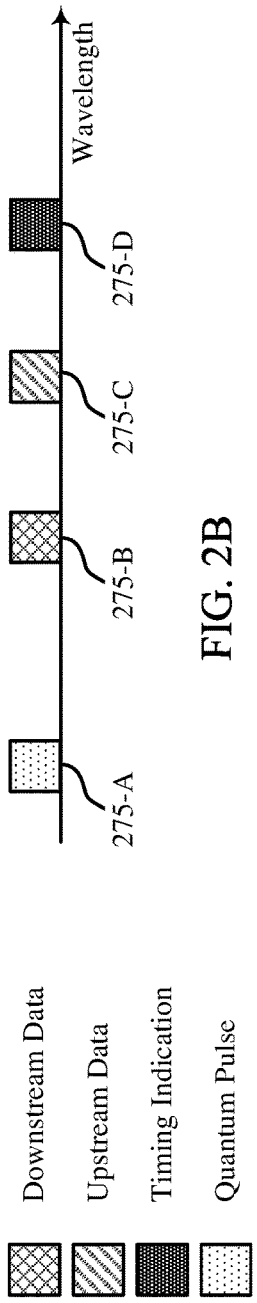
FIG. 2B illustrates an example of a wavelength plan that supports QKD in PONs in accordance with examples as disclosed herein.

FIGS. 2A and 2B illustrate an example of a system 200 and a wavelength plan 201 that support QKD in a PON in accordance with various aspects of the present disclosure. The system 200 may be an example of a point-to-multipoint TDM-PON system 200 configured to communicate data between a central node 205 and multiple remote nodes 210 that is encrypted using quantum keys (e.g., as described with reference to FIG. 1) and the wavelength plan 201 may be an example of a wavelength plan 201 for communications utilized by the system 200. Additionally, the system 200 may include aspects of the system 100 as described with reference to FIG. 1. For example, the central node 205, the remote nodes 210, and the optical splitter 215 may be examples of the central node 105, the remote nodes 110, and the optical component 115, respectively. The system 200 may additionally include a feeder fiber 260 for communications between the central node 205 and the optical splitter 215 and drop fibers 265 for communications between the optical splitter 215 and the remote nodes 210.

The system 200 may rely on time division multiplexing to communicate data, quantum keys, and timing indications between the central node 205 and one or more remote nodes 210. That is, each remote node 210 may be configured to identify resources that are time division multiplexed with the resources associated with other remote nodes 210 for communications with the central node 205. Additionally, as shown in FIG. 2B, the downstream data, upstream data, timing indications, and quantum pulses may be associated with different wavelengths 275. That is, the quantum channel may be associated with the wavelength 275-a (e.g., 1310 nm), the downstream channel may be associated with the wavelength 275-b (e.g., 1490 nm), the upstream channel may be associated with the wavelength 275-c (e.g., 1550 nm), and the synchronization channel (e.g., for communicating timing indications) may be associated with the wavelength 275-d (e.g., 1610 nm). In some cases, the downstream or upstream channels may additionally serve as an auxiliary channel for post-processing, including basis reconciliation, key sifting, error correction, and privacy amplification.

The remote node 210-a may include a data receiver 220-a, a synchronization pulse generator 225, a data transmitter 230-a, and a QKD transmitter 235, each coupled with a filter 240-a. The QKD transmitter 235 may be configured to generate quantum pulses indicating a quantum key for optical communications between the remote node 210-a and the central node 205. Additionally, the synchronization pulse generator 225 may be configured to generate timing indications for the quantum pulses indicating the quantum key. The data receiver 220-a may be configured to receive downstream data (e.g., encrypted using the quantum key) from the central node 205. The data receiver 220-a may additionally be configured to decrypt the encrypted downstream data using the quantum key. The data transmitter 230-a may be configured to transmit upstream data (encrypted using the quantum key) to the central node 205. That is, the data transmitter 230-a may be configured to identify the available upstream time slot resource and encrypt upstream data with the quantum.

The filter 240-a may be a coarse wavelength division multiplexing (CWDM) filter and may be configured to separate and combine optical signals. For example, the filter 240-a may receive optical signals from the optical splitter 215 via the drop fiber 265-a and separate them based on the wavelengths 275 of the optical signals and route the separated signals to different components of the remote node 210-a. For example, the filter 240-a may route optical signals having a wavelength 275-b (e.g., associated with the downstream channel) to the data receiver 220-a. Additionally, the filter 240-a may receive optical signals from the synchronization pulse generator 225, the data transmitter 230-a, and the QKD transmitter 235, and may propagate them to the optical splitter via the drop fiber 265-a.

The central node 205 may include a data transmitter 230-b, a synchronization pulse receiver 250, a data receiver 220-b, a QKD receiver 255, and filters 240-b and 240-c. The synchronization pulse receiver 250 may be configured to receive a timing indication from one or more remote nodes 210 and the QKD receiver 255 may consist of a set of SPDs configured to receive quantum pulses indicating quantum keys from the one or more remote nodes 210. The QKD receiver 255 may be configured to receive a single quantum pulse at a given time. The data transmitter 230-b may be configured to send downstream data to each of the one or more remote nodes 210, encrypt the downstream data using the quantum key associated with optical communications between the central node 205 and the remote node 210-a, and transmit the encrypted downstream data to the remote node 210-a. The data receiver 220-b may be configured to receive upstream data from one or more remote nodes 210. That is, the data receiver 220-b may receive encrypted upstream data from a remote node 210 and decrypt the encrypted upstream data using the quantum key associated with optical communications between the remote node 210 and the central node 205. The quantum key used for upstream data may be the same or different from the quantum key used for downstream data.

The QKD receiver 255 may be coupled with the filter 240-c. The filter 240-c may be a narrowband optical filter (e.g., a Fiber Bragg grating (FBG) filter). In some instances, the filter 240-c may filter some noise from the quantum channel (e.g., Raman noise) to improve a reliability of the quantum channel. That is, the wavelength 275-a of the quantum channel may be separated from the wavelengths of the classical channels (e.g., the downstream channel, the upstream channel, the synchronization channel), but there may still be Raman scattering noise originated from the classical channel. Additionally, temporally filtering the quantum channel (e.g., by only opening a gate of the QKD receiver 255 when a quantum pulse is indicated by a timing indication) may decrease an effect of noise on the quantum channel.

The filter 240-b may be a CWDM filter and may be configured to separate and combine optical signals. For example, the filter 240-b may receive optical signals from the optical splitter 215 via the feeder fiber 260 and separate them based on the wavelengths 275 of the optical signals and route the separated signals to different components of the central node 205. For example, the filter 240-b may route optical signals having a wavelength 275-a (e.g., associated with the quantum channel) to the QKD receiver 255. The filter 240-b may route optical signals having a wavelength 275-c (e.g., associated with the upstream channel) to the data receiver 220-b. The filter 240-b may route optical signals having the wavelength 275-d (e.g., associated with the synchronization channel) to the synchronization pulse receiver 250. Additionally, the filter 240-b may receive optical signals from the data transmitter 230-b and may propagate them to the optical splitter via the feeder fiber 260.

To communicate with the central node 205, the synchronization pulse generator 225 may generate a timing indication of one or more subsequent quantum pulses and may transmit the timing indication to the central node 205 (e.g., via the filter 240-a and the optical splitter 215). The synchronization pulse receiver 250 may receive the timing indication and identify when the subsequent quantum pulse(s) are to be received (e.g., in order to open a gate associated with the QKD receiver 255). Based on the timing indication, the QKD transmitter 235 may generate a quantum pulse and transmit the quantum pulse to the central node 205 via the filter 240-a and the optical splitter 215.

Figure 3A:
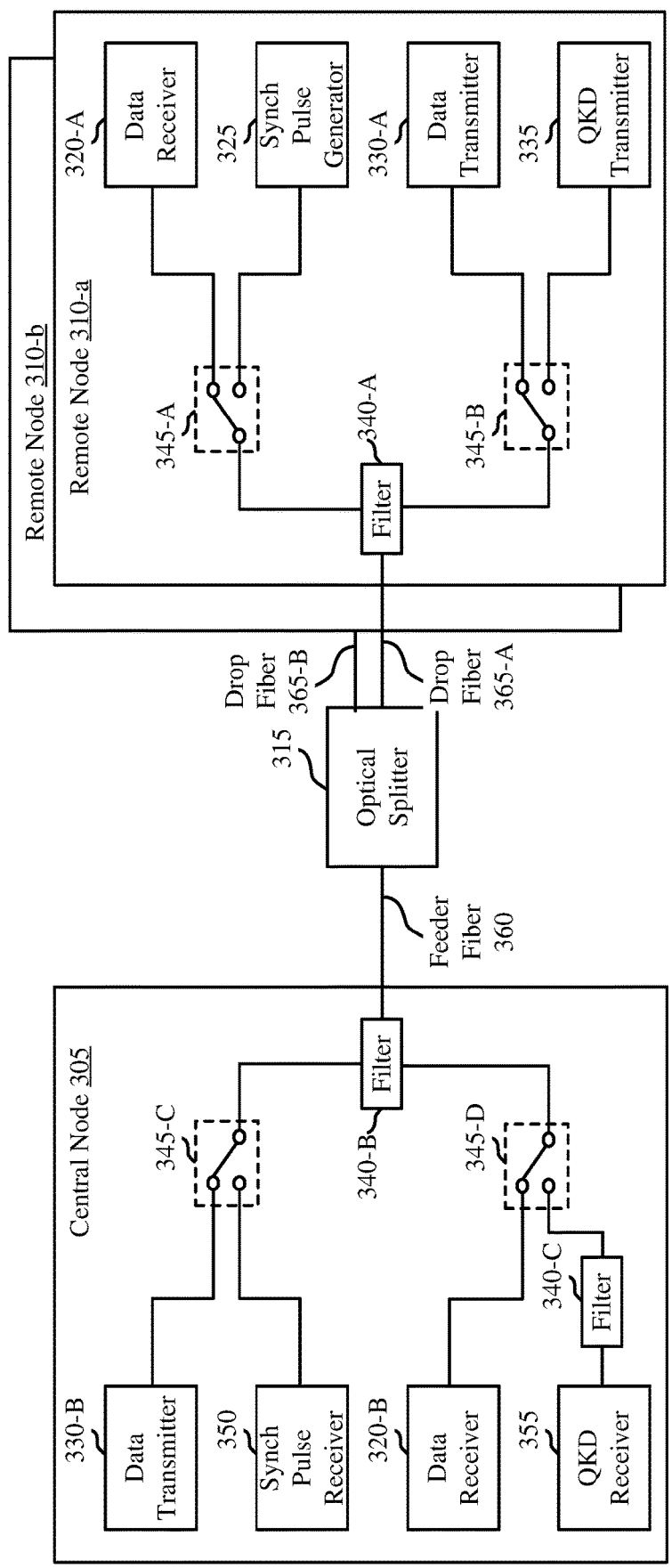
FIG. 3A illustrates an example of a system that supports QKD in PONs in accordance with examples as disclosed herein.
Figure 3B:
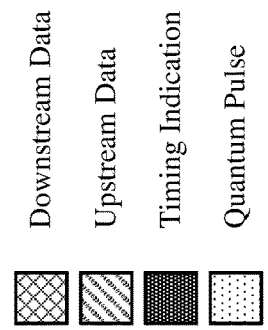
FIG. 3B illustrates an example of a wavelength plan that supports QKD in PONs in accordance with examples as disclosed herein.

FIGS. 3A and 3B illustrate an example of a system 300 and a wavelength plan 301 that support QKD in a PON in accordance with various aspects of the present disclosure. The system 300 may be an example of a point-to-multipoint TDM-PON system 300 configured to communicate data between a central node 305 and multiple remote nodes 310 that is encrypted using quantum keys (e.g., as described with reference to FIGS. 1 and 2) and the wavelength plan 301 may be an example of a wavelength plan 301 for communications utilized by the system 300. The system 300 may include aspects of the systems 100 and 200 as described with reference to FIGS. 1 and 2, respectively. For example, the central node 305, the remote nodes 310, and the optical splitter 315 may be examples of the similar components as described with reference to FIGS. 1 and 2.

The system 300 may rely on time division multiplexing to communicate data, quantum keys, and timing indications between the central node 305 and one or more remote nodes 310. Additionally, the system 300 may be configured to operate in either a classical mode or a quantum mode. That is, a set of time resources for communications between the central node 305 and the one or more remote nodes 310 may be configured for either classical communications (e.g., upstream data or downstream data) or quantum communications (e.g., timing indications or quantum pulses). In some cases, this additionally decreases noise on the quantum channel when compared to a system that is configured to support classical and quantum communications at the same time. As shown in FIG. 3B, the downstream data, upstream data, timing indications, and quantum pulses may be associated with different wavelengths 375. That is, the quantum channel and the upstream channel may be associated with the wavelength 375-a (e.g., 1310 nm). Additionally, the downstream channel and the synchronization channel may be associated with the wavelength 375-b (e.g., 1490 nm). Because the system 300 operates in either a classical mode or a quantum mode, the classical channels (e.g., the downstream channel and the upstream channel) may utilize similar wavelengths to the quantum channels (e.g., the quantum channel and the synchronization channel).

Each of the remote nodes 310 and the central node 305 may include switches 345 in order to switch between the quantum mode and the classical mode. For example, the remote node 310-a may include switches 345-a and 345-b and the central node 305 may include switches 345-c and 345-d. The switches 345 may be linked. For example, the switches 345 may couple a first set of components of the remote node 310 and the central node 305 with the filters 340 during the classical mode of communication (e.g., the data receivers 320 and the data transmitters 330) and may couple a second set of components of the remote node 310-a and the central node 305 with the filters 340 during the quantum mode of communications (e.g., the synchronization pulse generator 325, the QKD transmitter 335, the synchronization pulse receiver 350, and the QKD receiver 355).

The remote node 310-a may include a data receiver 320-a, a synchronization pulse generator 325, a data transmitter 330-a, and a QKD transmitter 335, each coupled with a filter 340-a. The QKD transmitter 335 may be configured to generate quantum pulses indicating a quantum key for optical communications between the remote node 310-a and the central node 305. Additionally, the synchronization pulse generator 325 may be configured to generate timing indications of the quantum pulses indicating the quantum key. The data receiver 320-a may be configured to receive downstream data (e.g., encrypted using the quantum key) from the central node 305. The data receiver 320-a may additionally be configured to decrypt the encrypted downstream data using the quantum key. The data transmitter 330-a may be configured to transmit upstream data (encrypted using the quantum key) to the central node 305. That is, the data transmitter 330-a may be configured to identify an available time slot resource for transmission to the central node 305 and encrypt the upstream data using the quantum key.

The filter 340-a may be a CWDM filter and may be configured to separate and combine optical signals. For example, the filter 340-a may receive optical signals from the optical splitter 315 via the drop fiber 365-a and separate them based on the wavelengths 375 of the optical signals and route the separated signals to different components of the remote node 310-a. For example, the filter 340-a may route optical signals having a wavelength 375-b (e.g., associated with the downstream channel) to the data receiver 320-a via the switch 345-a. Additionally, the filter 340-a may receive optical signals from the synchronization pulse generator 325, the data transmitter 330-a, and the QKD transmitter 335, and may propagate them to the optical splitter via the drop fiber 365-a.

The central node 305 may include a data transmitter 330-b, a synchronization pulse receiver 350, a data receiver 320-b, a QKD receiver 355, and filters 340-b and 340-c. The synchronization pulse receiver 350 may be configured to receive a timing indication from one or more remote nodes 310 and the QKD receiver 355 may consist of a set of SPDs configured to receive quantum pulses indicating quantum keys from the one or more remote nodes 310. The QKD receiver 355 may be configured to receive a single quantum pulse at a given time. The data transmitter 330-b may be configured to send downstream data to each of the one or more remote nodes 310, encrypt the downstream data using the quantum key associated with optical communications between the central node 305 and the remote node 310-a, and transmit the encrypted downstream data to the remote node 310-a. The data receiver 320-b may be configured to receive upstream data from one or more remote nodes 310. That is, the data receiver 320-b may receive encrypted upstream data from a remote node 310 and decrypt the encrypted upstream data using the quantum key associated with optical communications between the remote node 310 and the central node 305. The quantum key used for upstream data may be the same or different from the quantum key used for downstream data.

The QKD receiver 355 may be coupled with the filter 340-c. The filter 340-c may be a narrowband optical filter (e.g., a Fiber Bragg grating (FBG) filter). In some instances, the filter 340-c may filter some noise out of the quantum channel (e.g., Raman noise) to improve a reliability of the quantum channel. Additionally, temporally filtering the quantum channel (e.g., by only opening a gate of the QKD receiver 355 when a quantum pulse is indicated by a timing indication) may decrease an effect of noise on the quantum channel. Due to the alternative quantum and classical operation modes, rather than the upstream channel, downstream channel, and synchronization channel contributing noise to the quantum channel, only the synchronization channel may contribute noise to the quantum channel.

The filter 340-b may be a CWDM filter and may be configured to separate and combine optical signals. For example, the filter 340-b may receive optical signals from the optical splitter 315 via the feeder fiber 360 and separate them based on the wavelengths 375 of the optical signals and route the separated signals to different components of the central node 305. For example, the filter 340-b may route optical signals having a wavelength 375-a (e.g., associated with the quantum channel or the upstream channel) between the QKD receiver 355 or the data receiver 320-b and the optical splitter 315 (e.g., via the switch 345-d). In another example, the filter 340-b may route optical signals having the wavelength 375-d (e.g., associated with the synchronization channel or the downstream channel) between the synchronization pulse receiver 350 or the data transmitter 330-b and the optical splitter 315 (e.g., via the switch 345-c).

To communicate with the central node 305 and while the system 300 is operating in the quantum mode, the synchronization pulse generator 325 may generate a timing indication of one or more subsequent quantum pulses and may transmit the timing indication to the central node 305 (e.g., via the filter 340-a and the optical splitter 315). In the quantum mode, the synchronization pulse receiver 350 may receive the timing indication and identify when the subsequent quantum pulse(s) are to be received (e.g., in order to open a gate associated with the QKD receiver 355). The QKD transmitter 335 may generate a quantum pulse and transmit the quantum pulse to the central node 305 via the filter 340-a and the optical splitter 315. In some cases, by toggling the switches 345, the system 300 switches to classical mode for downstream and upstream optical communications.

FIGS. 4A and 4B illustrate an example of a system 400 and a wavelength plan 401 that support QKD in a PON in accordance with various aspects of the present disclosure. The system 400 may be an example of a point-to-multipoint WDM-PON system 400 configured to communicate data between a central node 405 and multiple remote nodes 410 that is encrypted using quantum keys (e.g., as described with reference to FIG. 1) and the wavelength plan 401 may be an example of a wavelength plan 401 for communications utilized by the system 400. Additionally, the system 400 may include aspects of the system 100 as described with reference to FIG. 1. For example, the central node 405, the remote nodes 410, and the cyclic arrayed waveguide gratings (AWG) router 415 (or another type of optical multiplexer) may be examples of the central node 105, the remote nodes 110, and the optical component 115, respectively. The system 400 may additionally include a feeder fiber 460 for communications between the central node 405 and the cyclic AWG router 415 and drop fibers 465 for communications between the cyclic AWG router 415 and the remote nodes 410.

The system 400 may rely on wavelength division multiplexing to communicate data, quantum keys, and timing indications between the central node 405 and one or more remote nodes 410. That is, each remote node 410 may utilize resources that are wavelength division multiplexed with the resources associated with other remote nodes 410 for communications with the central node 405. Additionally, as shown in FIG. 4B, the downstream data, upstream data, timing indications, and quantum pulses may be associated with wavelengths 475, which may be different or at least partially overlapping. For example, the quantum channel may be associated with the wavelength 475-a (e.g., 1310 nm), the downstream channel may be associated with the wavelength 475-b (e.g., 1490 nm), the upstream channel may be associated with the wavelength 475-c (e.g., 1550 nm), and the synchronization channel (e.g., for communicating timing indications) may be associated with the wavelength 475-d (e.g., 1610 nm).

As shown in FIG. 4B, each of the optical signals (e.g., the quantum pulses, the downstream data, the upstream data, and the timing indications) include multiple wavelengths 475. Here, each of the wavelengths 475 may be associated with one of the remote nodes 410. For example, the downstream data 475-b includes more than one distinct wavelength 475. Each of distinct wavelengths 475 may be associated with one remote node 410. In one example, the remote node 410-a may be associated with a first distinct wavelength 475 within the wavelengths 475-a for transmitting a quantum pulse, a second distinct wavelength 475 within the wavelengths 475-b for receiving downstream data, a third distinct wavelength 475 within the wavelengths 475-c for transmitting upstream data, and a fourth distinct wavelength 475 within the wavelengths 475-d for transmitting timing indications. In some examples, each of the remote nodes 410 may be associated with an index, and may use a wavelength 475 within each of the wavelengths 475-a, 475-b, 475-c, and 475-d determined according to the index.

The remote node 410-a may include a data receiver 420-a, a synchronization pulse generator 425, a data transmitter 430-a, and a QKD transmitter 435, each coupled with a filter 440-a. The QKD transmitter 435 may be configured to generate a quantum pulse indicating a quantum key for optical communications between the remote node 410-a and the central node 405. Additionally, the synchronization pulse generator 425 may be configured to generate a timing indication of the quantum pulse indicating the quantum key. The data receiver 420-a may be configured to receive downstream data (e.g., encrypted using the quantum key) from the central node 405. The data receiver 420-a may additionally be configured to decrypt the encrypted downstream data using the quantum key. The data transmitter 430-a may be configured to transmit upstream data (encrypted using the quantum key) to the central node 405. That is, the data transmitter 430-a may be configured to transmit upstream data to the central node 405 and encrypt the upstream data using the quantum key.

The filter 440-a may be a CWDM filter and may be configured to separate and combine optical signals. For example, the filter 440-a may receive optical signals from the cyclic AWG router 415 via the drop fiber 465-a and separate them based on the wavelengths 475 of the optical signals and route the separated signals to different components of the remote node 410-a. For example, the filter 440-a may route optical signals having a wavelength 475-b (e.g., associated with the downstream channel) to the data receiver 420-a. Additionally, the filter 440-a may receive optical signals from the synchronization pulse generator 425, the data transmitter 430-a, and the QKD transmitter 435, and may propagate them to the cyclic AWG router via the drop fiber 465-a.

The central node 405 may include a data transmitter 430-b, a synchronization pulse receiver 450, a data receiver 420-b, a QKD receiver 455, and filters 440-c, 44-d, 440-e, 440-f, and 440-g. The synchronization pulse receiver 450 may be configured to receive a timing indication from one or more remote nodes 410 and the QKD receiver 455 may be single photon detector configured to receive quantum pulses indicating quantum keys from the one or more remote nodes 410. The QKD receiver 455 may be configured to receive a single quantum pulse at a given time. The data transmitter 430-b may be configured to transmit downstream data for transmission to each of the one or more remote nodes 410, encrypt the downstream data using the quantum key associated with optical communications between the central node 405 and the remote node 410-a, and transmit the encrypted downstream data to the remote node 410-a. The data receiver 420-b may be configured to receive upstream data from one or more remote nodes 410. That is, the data receiver 420-b may receive encrypted upstream data from a remote node 410-a and decrypt the encrypted upstream data using the quantum key associated with optical communications between the remote node 410-a and the central node 405.

The QKD receiver 455 may be coupled with the filter 440-g. The filter 440-g may be a narrowband optical filter (e.g., a Fiber Bragg grating (FBG) filter). In some instances, the filter 440-c may filter some noise from the quantum channel (e.g., Raman noise) to improve a reliability of the quantum channel. That is, the wavelength 475-a of the quantum channel may be separated from the wavelengths of the classical channels (e.g., the downstream channel, the upstream channel, the synchronization channel), but there may still be Raman scattering noise associated with the quantum channel. Additionally, temporally filtering the quantum channel (e.g., by only opening a gate of the QKD receiver 455 when a quantum pulse is indicated by a timing indication) may decrease an effect of noise on the quantum channel.

The filter 440-*b* may be a CWDM filter and may be configured to separate and combine optical signals. For example, the filter 440-*b* may receive optical signals from the cyclic AWG router 415 via the feeder fiber 460 and separate them based on the wavelengths 475 of the optical signals and route the separated signals to different components of the central node 405. For example, the filter 440-*b* may route optical signals having a wavelength 475-*a* (e.g., associated with the quantum channel) to the QKD receiver 455. In another example, the filter 440-*b* may route optical signals having a wavelength 475-*c* (e.g., associated with the upstream channel) to the data receiver 420-*b*. In another example, the filter 440-*b* may route optical signals having the wavelength 475-*d* (e.g., associated with the synchronization channel) to the synchronization pulse receiver 450. Additionally, the filter 440-*b* may receive optical signals from the data transmitter 430-*b* and may propagate them to the cyclic AWG router via the feeder fiber 460.

The central node 405 may additionally include filters 440-*c*, 440-*d*, 440-*e*, and 440-*g*, which may be AWG filters. These filters 440 may be coupled with the components of the central node 405 and may further filter the optical signals based on the wavelengths 475 of the optical signals. That is, the filter 440-*b* may be configured to separate or combine optical signals based on a type of optical signal. For example, the filter 440-*b* may separate or combine the optical signal based on whether the optical signal is a quantum pulse, a timing indication, upstream data, or downstream data (e.g., based on a wavelength of the optical signal). The filters 440-*c*, 440-*d*, 440-*e*, and 440-*f* may be configured to separate or combine optical signals associated with different remote nodes 410. That is, each signal output from the filter 440-*b* may include optical signals associated with multiple remote nodes 410, each associated with different wavelengths within a range of wavelengths (e.g., as illustrated by FIG. 4B). For example, the filter 440-*c* may be configured to receive downstream data from the data transmitter 430-*b* (or, in some cases, from multiple data transmitters 430-*b* or component data transmitters of data transmitter 430-*b* each associated with a different remote node 410), where the downstream data includes multiple different wavelengths each associated with a different remote node 410-*a*. The filter 440-*c* may then combine the multiple different wavelengths to output an optical signal including the wavelengths 475-*b* associated with downstream data transmissions. Similarly, filters 440-*d*, 440-*e*, and 440-*f* may be configured to receive optical signals and separate the optical signals into the wavelengths associated with each of the remote nodes 410, which may then be passed to different instances of the synchronization pulse receivers 450, data receivers 420-*b*, and QCK receivers 455 (or different component receivers associated with the different wavelengths), respectively.

To communicate with the central node 405, the synchronization pulse generator 425 may generate a timing indication of a subsequent quantum pulse and may transmit the timing indication to the central node 405 (e.g., via the filter 440-*a* and the cyclic AWG router 415). The synchronization pulse receiver 450 may receive the timing indication and identify when the subsequent quantum pulse is to be received (e.g., in order to open a gate associated with the QKD receiver 455). Based on the timing indication, the QKD transmitter 435 may generate a quantum pulse and transmit the quantum pulse to the central node 405 via the filter 440-*a* and the cyclic AWG router 415.

In some cases, the system 400 may additionally include a dual feeder fiber 470 and a filter 440-*h*. Here, the filter 440-*h* may direct quantum pulses to the central node 405 via the dual feeder fiber 470 (e.g., instead of the feeder fiber 460). In some cases, this may decrease an amount of noise on the quantum channel and improve a signal quality associated with quantum pulse transmissions.

Figures 5A, 5B:
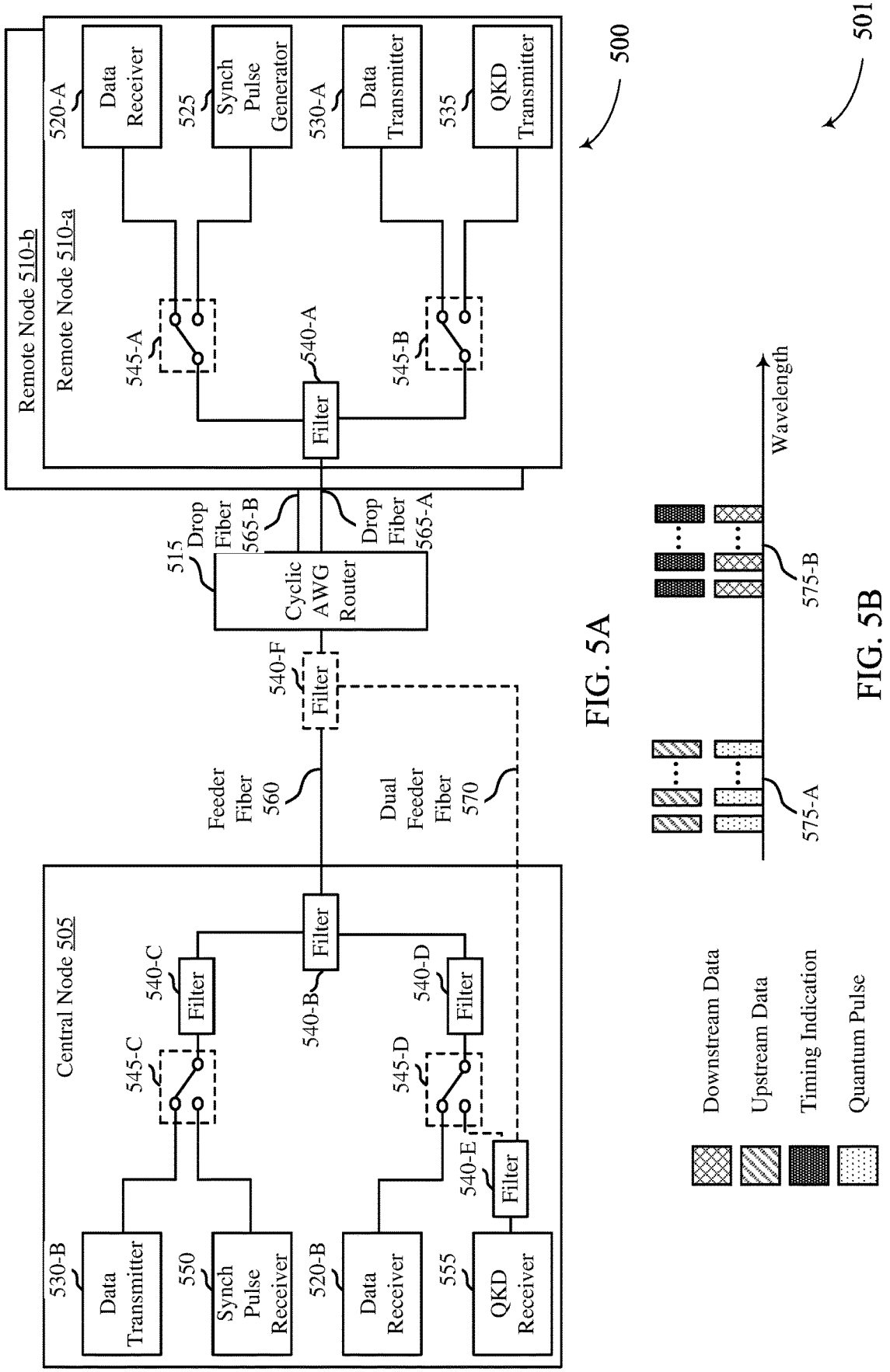
FIG. 5A illustrates an example of a system that supports QKD in PONs in accordance with examples as disclosed herein.
FIG. 5B illustrates an example of a wavelength plan that supports QKD in PONs in accordance with examples as disclosed herein.

FIGS. 5A and 5B illustrate an example of a system 500 and a wavelength plan 501 that support QKD in a PON in accordance with various aspects of the present disclosure. The system 500 may be an example of a point-to-multipoint WDM-PON system 500 configured to communicate data between a central node 505 and multiple remote nodes 510 that is encrypted using quantum keys (e.g., as described with reference to FIGS. 1 and 4) and the wavelength plan 501 may be an example of a wavelength plan 501 for communications utilized by the system 500. Additionally, the system 500 may include aspects of the systems 100 and 400 as described with reference to FIGS. 1 and 4. For example, the central node 505, the remote nodes 510, and the cyclic AWG router 515 (or another type of optical multiplexer) may be examples of similar components as described with reference to FIGS. 1 and 4. The system 500 may additionally include a feeder fiber 560 for communications between the central node 505 and the cyclic AWG router 515 and a drop fibers 565 for communications between the cyclic AWG router 515 and the remote node 510.

The system 500 may rely on wavelength division multiplexing to communicate data, quantum keys, and timing indications between the central node 505 and one or more remote nodes 510. That is, each remote node 510 may be configured to utilize resources that are wavelength division multiplexed with the resources associated with other remote nodes 510 for communications with the central node 505. Additionally, the system 300 may be configured to operate in either a classical mode or a quantum mode. That is, a set of time resources for communications between the central node 505 and the one or more remote nodes 510 may be configured for either classical communications (e.g., upstream data or downstream data) or quantum communications (e.g., timing indications or quantum pulses). In some cases, this may additionally decrease an amount of noise on the quantum channel when compared to a system that is configured to support classical and quantum communications during overlapping time resources.

As shown in FIG. 5B, the downstream data, upstream data, timing indications, and quantum pulses may be associated with wavelengths 575, which may be different or at least partially overlapping. For example, the quantum channel and the upstream channel may be associated with the wavelength 575-*a* (e.g., 1310 nm). Additionally, the downstream channel and the synchronization channel may be associated with the wavelength 575-*b* (e.g., 1490 nm). To enable the WDM communications, each of the optical signals (e.g., the quantum pulses, the downstream data, the upstream data, and the timing indications) include multiple wavelengths 575. Here, each of the wavelengths 575 may be associated with one of the remote nodes 510. For example, the downstream data 575-*b* may include more than one distinct wavelength 575, where each of distinct wavelengths 575 may be associated with one remote node 510. In some examples, each of the remote nodes 510 may be associated with an index, and may use a wavelength 575 within each of the wavelengths 575-*a*, 575-*b*, 575-*c*, and 575-*d* determined according to the index. Because the system 500 operates in either a classical mode or a quantum mode, the classical channels (e.g., the downstream channel and the upstream channel) may utilize similar wavelengths to the quantum channels (e.g., the quantum channel and the synchronization channel).

Each of the remote nodes 510 and the central node 505 may include switches 545 in order to switch between the quantum mode and the classical mode. For example, the remote node 510-*a* may include switches 545-*a* and 545-*b* and the central node 505 may include switches 545-*c* and 545-*d*. In some cases, the switches 545 may be linked. For example, the switches 545 may couple a first set of components of the remote node 510 and the central node 505 with the filters 540 during the classical mode of communication (e.g., the data receivers 520 and the data transmitters 530) and may couple a second set of components of the remote node 510-*a* and the central node 505 with the filters 540 during the quantum mode of communications (e.g., the synchronization pulse generator 525, the QKD transmitter 535, the synchronization pulse receiver 550, and the QKD receiver 555).

The remote node 510-*a* may include a data receiver 520-*a*, a synchronization pulse generator 525, a data transmitter 530-*a*, and a QKD transmitter 535, each coupled with a filter 540-*a*. The QKD transmitter 535 may be configured to generate quantum pulses indicating a quantum key for optical communications between the remote node 510-*a* and the central node 505. Additionally, the synchronization pulse generator 525 may be configured to generate timing indications for the quantum pulses indicating the quantum key. The data receiver 520-*a* may be configured to receive downstream data (e.g., encrypted using the quantum key) from the central node 505. The data receiver 520-*a* may additionally be configured to decrypt the encrypted downstream data using the quantum key. The data transmitter 530-*a* may be configured to transmit upstream data (encrypted using the quantum key) to the central node 505. That is, the data transmitter 530-*a* may be configured to transmit upstream data for transmission to the central node 505 and encrypt the upstream data using the quantum key.

The filter 540-*a* may be a CWDM filter and may be configured to separate and combine optical signals. For example, the filter 540-*a* may receive optical signals from the cyclic AWG router 515 via the drop fiber 565-*a* and separate them based on the wavelengths 575 of the optical signals and route the separated signals to different components of the remote node 510-*a*. For example, the filter 540-*a* may route optical signals having a wavelength 575-*b* (e.g., associated with the downstream channel) to the data receiver 520-*a*. Additionally, the filter 540-*a* may receive optical signals from the synchronization pulse generator 525, the data transmitter 530-*a*, and the QKD transmitter 535, and may propagate them to the cyclic AWG router via the drop fiber 565-*a*.

The central node 505 may include a data transmitter 530-*b*, a synchronization pulse receiver 550, a data receiver 520-*b*, a QKD receiver 555, and filters 540-*c*, 540-*d*, 540-*e*, 540-*f*, and 540-*g*. The synchronization pulse receiver 550 may be configured to receive a timing indication from one or more remote nodes 510 and the QKD receiver 555 may be single photon detector configured to receive quantum pulses indicating quantum keys from the one or more remote nodes 510. The QKD receiver 555 may be configured to receive a single quantum pulse at a given time. The data transmitter 530-*b* may be configured to transmit downstream data for transmission to each of the one or more remote nodes 510, encrypt the downstream data using the quantum key associated with optical communications between the central node 505 and the remote node 510-*a*, and transmit the encrypted downstream data to the remote node 510-*a*. The data receiver 520-*b* may be configured to receive upstream data from one or more remote nodes 510. That is, the data receiver 520-*b* may receive encrypted upstream data from a remote node 510-*a* and decrypt the encrypted upstream data using the quantum key associated with optical communications between the remote node 510-*a* and the central node 505.

The QKD receiver 555 may be coupled with the filter 540-*e*. The filter 540-*e* may be a narrowband optical filter (e.g., an FBG filter). In some instances, the filter 540-*e* may filter some noise from the quantum channel (e.g., Raman noise) to improve a reliability of the quantum channel. Additionally, temporally filtering the quantum channel (e.g., by only opening a gate of the QKD receiver 555 when a quantum pulse is indicated by a timing indication) may decrease an effect of noise on the quantum channel. In some cases, the system 500 may additionally include a dual feeder fiber 570 and a filter 540-*h*. Here, the filter 540-*h* may direct quantum pulses to the central node 505 via the dual feeder fiber 570 (e.g., instead of the feeder fiber 560). In some cases, this may decrease an amount of noise on the quantum channel and improve a signal quality associated with quantum pulse transmissions.

The filter 540-*b* may be a CWDM filter and may be configured separate and combine optical signals. For example, the filter 540-*b* may receive optical signals from the cyclic AWG router 515 via the feeder fiber 560 and separate them based on the wavelengths 575 of the optical signals and route the separated signals to different components of the central node 505. For example, the filter 540-*b* may route optical signals having a wavelength 575-*a* (e.g., associated with the upstream channel or the quantum channel) to the data receiver 520-*b* or the QKD receiver 555 via switch 545-*d*. In another example, the filter 540-*b* may route optical signals having the wavelength 575-*b* (e.g., associated with the downstream channel or the synchronization channel) between the data transmitter 530-*b* or the synchronization pulse receiver 550 and the filter 540-*b* (e.g., by the switch 545-*c*).

The central node 505 may additionally include filters 540-*c* and 540-*d*, which may be AWG filters. These filters 540 may be coupled with the components of the central node 505 and may further filter the optical signals based on the wavelengths 575 of the optical signals. That is, the filter 540-*b* may be configured to separate or combine optical signals based on a type of optical signal. For example, the filter 540-*b* may separate or combine the optical signal based on whether the optical signal is a quantum pulse, a timing indication, upstream data, or downstream data (e.g., based on a wavelength of the optical signal). The filters 540-*c* and 540-*d* may be configured to separate or combine optical signals associated with different remote nodes 510. That is, each signal output from the filter 540-*b* may include optical signals associated with multiple remote nodes 510, each associated with a different wavelength within a range of wavelengths (e.g., as illustrated by FIG. 5B). For example, the filter 540-*c* may be configured to receive downstream data from the data transmitter 530-*b* (or, in some cases, from multiple data transmitters 530-*b* or component data transmitters of data transmitter 530-*b* each associated with a different remote node 510), where the downstream data includes multiple different wavelengths each associated with a different remote node 510. The filter 540-*c* may then combine the multiple different wavelengths to output an optical signal including the wavelengths 575-*b* associated with downstream data transmissions. The filter 540-*c* may similarly separate an optical signal including the wavelengths 575-*b* into component wavelengths associated with each of the remote nodes 510 for upstream data transmissions, to pass each of the different component wavelengths to a different instance of the sync pulse receiver 550 (or different component receivers of the sync pulse receiver 550). Similarly, filter 540-*d* may be configured to receive optical signals and separate the optical signals into the wavelengths associated with each of the remote nodes 510, which may then be passed to different instances of the synchronization pulse receivers 520-*b* and QCK receivers 555 (or different component receivers associated with the different wavelengths), respectively.

To communicate with the central node 505, the synchronization pulse generator 525 may generate a timing indication of one or more subsequent quantum pulses and may transmit the timing indication to the central node 505 (e.g., via the filter 540-*a* and the cyclic AWG router 515). The synchronization pulse receiver 550 may receive the timing indication and identify when the subsequent quantum pulse(s) are to be received (e.g., in order to open a gate associated with the QKD receiver 555). Based on the timing indication, the system 500 may switch to a classical mode for optical communications (e.g., by toggling the switches 545) and the QKD transmitter 535 may generate a quantum pulse and transmit the quantum pulse to the central node 505 via the filter 540-*a* and the optical splitter 515.

Figure 6:
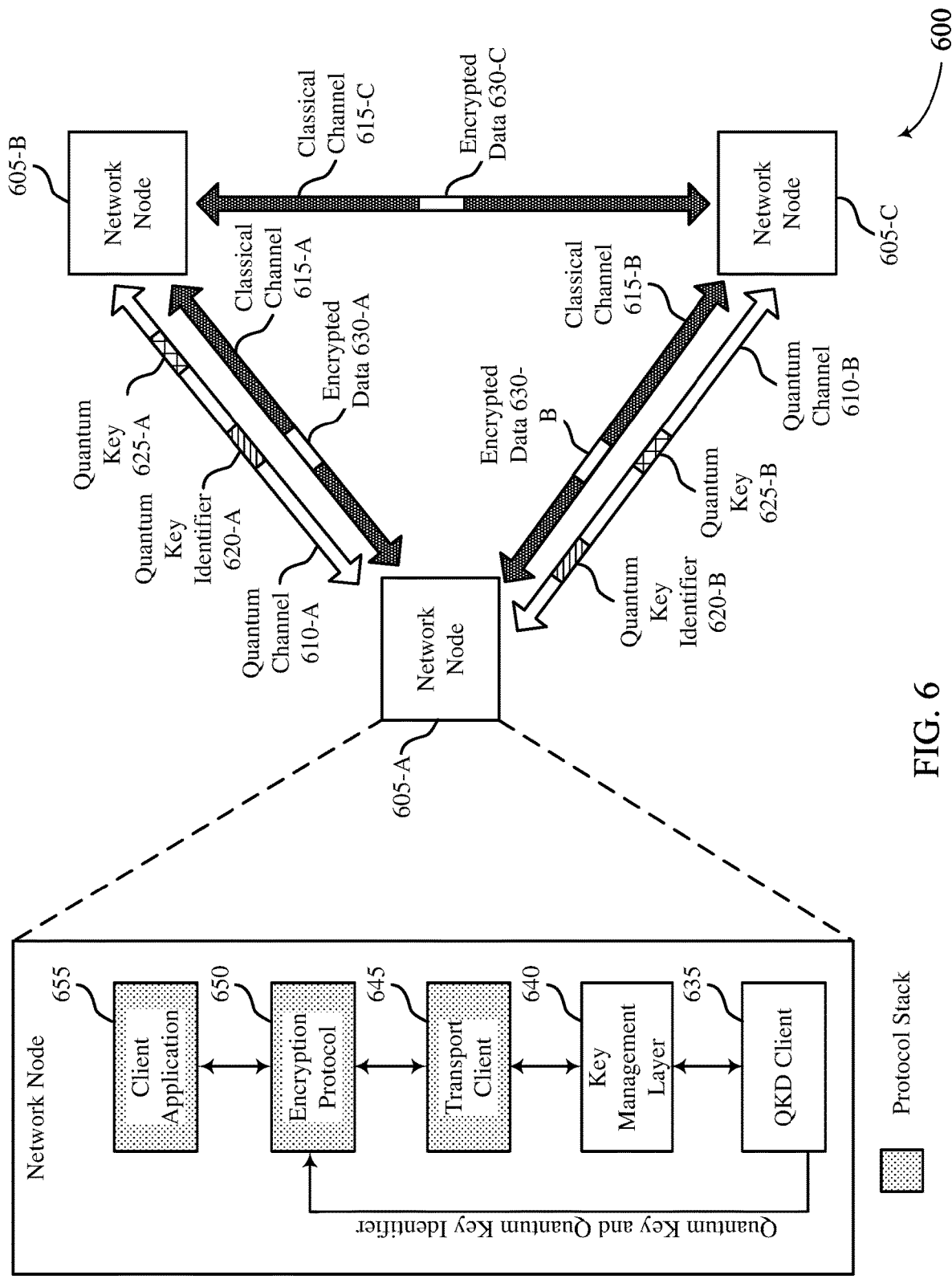
FIGS. 6 and 7 illustrates an example of a system that supports QKD in PONs in accordance with examples as disclosed herein.

FIG. 6 illustrates an example of a system 600 that support QKD in accordance with various aspects of the present disclosure. The system 600 may be an example of a hybrid system for internet communications. In some cases, the system 600 may employ aspects of the point-to-multipoint PON system as described with reference to FIGS. 1 through 5. For example, the network nodes 605 may be examples of the network nodes (e.g., the remote nodes, the central nodes) as described herein. The system 600 may include network nodes 605 configured to communicate encrypted data using classical channels 615. The system 600 may additionally include one or more quantum channels 610 for communicating quantum keys (e.g., by quantum pulses as described herein) used to encrypt data communications between the network nodes 605.

The network node 605-*a* may be in communication with both the network node 605-*b* and the network node 605-*c* by quantum channels 610 and classical channels 615. The network node 605-*a* may communicate quantum keys 625 (pre-shared keys) with the network nodes 605-*b* and 605-*c* via the quantum channels 610. For example, the network node 605-*a* may communicate a quantum key 625-*a* and a quantum key identifier 620-*a* (e.g., identifying the quantum key 625-*a*) to the network node 605-*b* by the quantum channel 610-*a*. Additionally, the network node 605-*a* may communicate a quantum key 625-*b* and a quantum key identifier 620-*b* (e.g., identifying the quantum key 625-*b*) to the network node 605-*c* by the quantum channel 610-*b*.

After communicating the quantum keys 625 and quantum key identifiers 620, the network node 605-*a* may communicate encrypted data 630 with the network nodes 605-*b* and 605-*c* via classical channels. That is, a transmitting network node 605 may use a quantum key 625 to generate the encrypted data 630 and a receiving network node 605 may use the quantum key 625 to decrypt the encrypted data 630. For example, the network node 605-*a* may utilize the quantum key 625-*a* to communicate the encrypted data 630-*a* with the network node 605-*b* via the classical channel 615-*a*. In some cases, the encrypted data 630-*a* may include an indication of the quantum key identifier 620-*a*. In another example, the network node 605-*a* may utilize the quantum key 625-*b* to communicate the encrypted data 630-*b* with the network node 605-*c* via the classical channel 615-*b*. In some instances, the encrypted data 630-*b* may include an indication of the quantum key identifier 620-*b*.

In some instances, the network nodes 605-*b* and 605-*c* may not be directly coupled by a quantum channel 610. That is, the network nodes 605-*b* and 605-*c* may not be configured to directly communicate a quantum key (e.g., for generating or decrypting the encrypted data 630-*c*) via a quantum channel 610. Here, the network node 605-*a* may be configured to transmit a message to each of the network nodes 605-*b* and 605-*c* to indicate a quantum key 625 for communications between the network nodes 605-*b* and 605-*c*. That is, the network node 605-*a* may transmit a message (e.g., to both of the network nodes 605-*b* and 605-*c*) indicating a quantum key 625 that is derived from a combination of the quantum keys 625-*a* and 625-*b*. For example, the message may indicate a quantum key 625 that is derived from a logical combination (e.g., an exclusive OR combination) of the quantum keys 625-*a* and 625-*b*.

Based on receiving the message indicating the derived quantum key 625, each of the network nodes 605-*b* and 605-*c* may identify both the quantum keys 625-*a* and 625-*b*. For example, the network node 605-*c* may identify the quantum key 625-*a* based on the indicated derived quantum key 625 and the quantum key 625-*b* (e.g., received from the network node 605-*a* via the quantum channel 610-*b*). Thus, both the network nodes 605-*b* and 605-*c* may identify both quantum keys 625-*a* and 625-*b*. The network nodes 605-*b* and 605-*c* may use a combination of the quantum keys 625-*a* and 625-*b* to communicate the encrypted data 630-*c* via the classical channel 615-*c*.

The network nodes 605 may each include one or more layers or components. As an example, the various layers or components of the network node 605-*a* are illustrated, but the network nodes 605-*b* and 605-*c* may include similar layers or components. The network node 605-*a* may include a QKD client 635, a key management layer 640, a transport client 645, an encryption protocol 650, and a client application 655. The QKD client 635 of the network node 605-*a* may be configured to communicate (e.g., transmit, receive) quantum keys 625 to or from another network node 605 via a quantum channel 610. The QKD client 635 may be configured to transfer the quantum key 625 and quantum key identifier 620 from the QKD client 635 to the encryption protocol 650 (e.g., directly to the encryption protocol 650 and without the transport client 645). The QKD client 635 may additionally communicate the quantum key 625 and the quantum key identifier 620 to the key management layer 640 of the network node 605-*a*. The key management layer 640 may be configured to store the quantum key 625 and the quantum key identifier 620.

The transport client 645, encryption protocol 650, and the client application 655 may be part of a protocol stack of the network node 605-*a* and may be configured to receive data (e.g., associated with the client application 655) via the classical channel 615-*a* and 615-*b*. The transport client 645 may communicate the encrypted data to the encryption protocol 650 to be decoded. Additionally, the encryption protocol 650 may be configured to encrypt data prior to communicating the data via the classical channels 615. That is, the encryption protocol 650 may be an example of a TLS client and may include software packages (e.g., GNUTLS, OPENSSL) that may include libraries for performing the encryption functions for communicating encrypted information.

Figure 7:
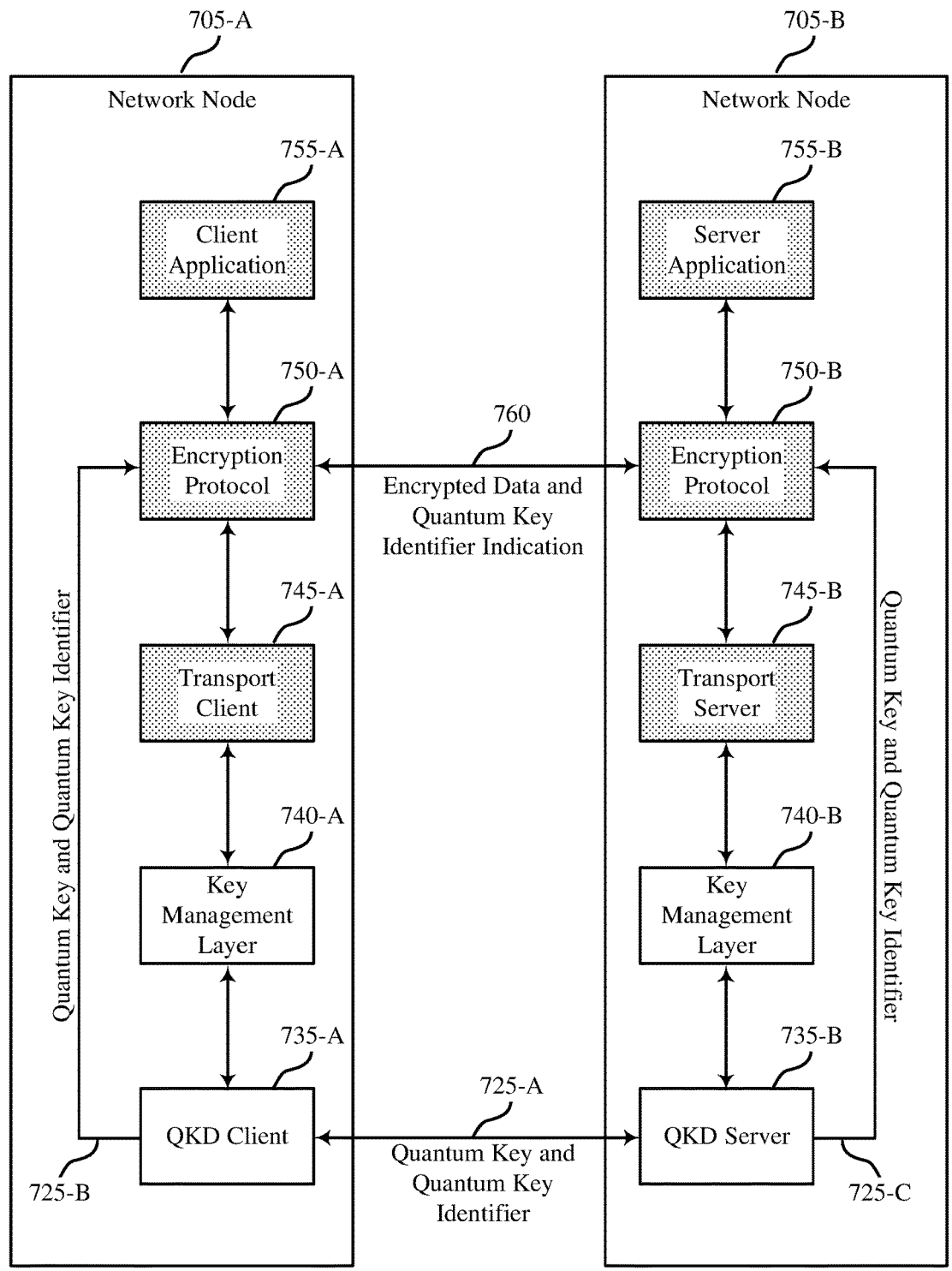

FIG. 7 illustrates an example of a system 700 that support QKD in accordance with various aspects of the present disclosure. The system 700 may be an example of a hybrid system and may implement aspects of the point-to-multipoint PON systems and other hybrid systems as described with reference to FIGS. 1 through 5. For example, the network nodes 705 may be examples of the network nodes (e.g., the remote nodes, the central nodes) as described herein. The system 700 may include network nodes 705 configured to communicate data encrypted using quantum keys.

The network node 705-a may include a QKD client 735-a, a key management layer 740-a, a transport client 745-a, an encryption protocol 750-a, and a client application 755-a. The network node 705-b may include a QKD server 735-b, a key management layer 740-b, a transport server 745-b, an encryption protocol 750-b, and a server application 755-b. The QKD server 735-b of the network node 705-b may be configured to provide the quantum key and quantum key identifier 725-a to the QKD client 735-a of the network node 705-a (e.g., by a quantum channel). The QKD server 735-b of the network node 705-b may additionally communicate the quantum key and quantum key identifier 725-c to the encryption protocol 750-b (e.g., within a protocol stack of the network node 705-b). In some cases, the quantum key identifier may be unique between the two internet protocol (IP) addresses of the network nodes 705-a and 705-b. Additionally, the QKD server 735-b may communicate the quantum key and quantum key identifier 725-c to the key management layer 740-b. The key management layer 740-b may be configured to store the quantum key and quantum key identifier 725-c. For example, the key management layer 740-b may store the quantum key and quantum key identifier 725-c along with the IP addresses associated with the network nodes 705-a and 705-b.

When the network node 705-a receives the quantum key and quantum key identifier 725-a, the QKD client 735-a may communicate the quantum key and quantum key identifier 725-c to the key management layer 740-a (e.g., for storage). For example, the key management layer 740-a may store the quantum key and quantum key identifier 725-b along with the IP addresses associated with the network nodes 705-a and 705-b.

The transport layer 745-a, encryption protocol 750-a, and client application 755-a may be part of a protocol stack of the network node 705-a and may be configured to receive encrypted data (e.g., associated with the application 755) and quantum key identifier indications 760 from the network node 705-b (e.g., via a classical channel). In some cases, the transport client 745-a may receive and transmit the encrypted data to and from the network node 705-b and communicate the encrypted data to the encryption protocol 750-a. The transport layer 745-b, encryption protocol 750-b, and server application 755-b may be part of a communication protocol stack of the network node 705-b and may be configured to receive encrypted data (e.g., associated with the application 755) and quantum key identifier indications 760 from the network node 705-a (e.g., via a classical channel). The communication protocol stack may include, for example (transport, network, data link, or physical layers). In some cases, the transport server 745-b may use TCP for reliability and flow control to receive and transmit the encrypted data to and from the network node 705-a and communicate the encrypted data to the encryption protocol 750-b.

When transmitting data to the network node 705-a, the server application 755-b may provide the data for transmission to the encryption protocol 750-b and an indication of the network node 705-a (e.g., an IP address associated with the network node 705-a). The encryption protocol 750-b may retrieve the quantum key associated with communications between the network node 705-b and 705-a (e.g., from the key management layer 740-b). The encryption protocol 750-b may then encrypt the data from the server application 755-b using the quantum key associated with the network node 705-a and transmit the encrypted data and a quantum key identifier indication 760 to the network node 705-a. The network node 705-a may receive the encrypted data and a quantum key identifier indication 760 from the network node 705-b (e.g., by the encryption protocol 750-a or the transport client 745-a). The encryption protocol 750-a may retrieve the quantum key (e.g., from the key management layer 740-a) based on the quantum key identifier indication and may use the quantum key to decrypt the data.

To transmit data from the network node 705-a to the network node 705-b, the client application 755-a may provide the data for transmission to the encryption protocol 750-a and an indication of the network node 705-b (e.g., an IP address associated with the network node 705-b). The encryption protocol 750-a may retrieve the quantum key associated with communications between the network node 705-b and 705-a (e.g., from the key management layer 740-a). For example, the transport client 745-a may receive an indication of an IP address associated with the network node 705-b (e.g., from a routing table). The transport client 745-a may indicate the IP address associated with the network node 705-b, and the key management layer 740-a may determine a quantum key for communication with the network node 705-b. The quantum key may be, for example, directly exchanged with the network node 705-b over a quantum channel, or may be a combination of keys derived from keys exchanged with one or more other network nodes over quantum channels as described above. The encryption protocol 750-a may then encrypt the data from the client application 755-a using the quantum key associated with the network node 705-b and transmit the encrypted data and a quantum key identifier indication 760 to the network node 705-b. The network node 705-b may receive the encrypted data and a quantum key identifier indication 760 from the network node 705-a (e.g., by the encryption protocol 750-b or the transport server 745-b). The encryption protocol 750-b may retrieve the quantum key (e.g., from the key management layer 740-b) based on the quantum key identifier indication and may use the quantum key to decrypt the data.

In some cases, the network nodes 705 may additionally include an IP layer. The IP layer may be configured to identify to which next network node 705 (e.g., the network node 705-b) to transmit data (e.g., in order to route the data to a correct destination network node 705). The IP layer of the current network node 705-a may identify the next network node 705-b based on routing tables, which may indicate the next network node 705-b using an IP address. Here, the current network node 705-a may use that IP address to search (e.g., within the key management layer 740) for the quantum key associated with communications with the next network node 705-b. The key management layer 740 may then provide the necessary quantum key (or combination of more than one quantum key) to encrypt the data prior to communicating the data to the next network node 705-*b*.

Figure 8:
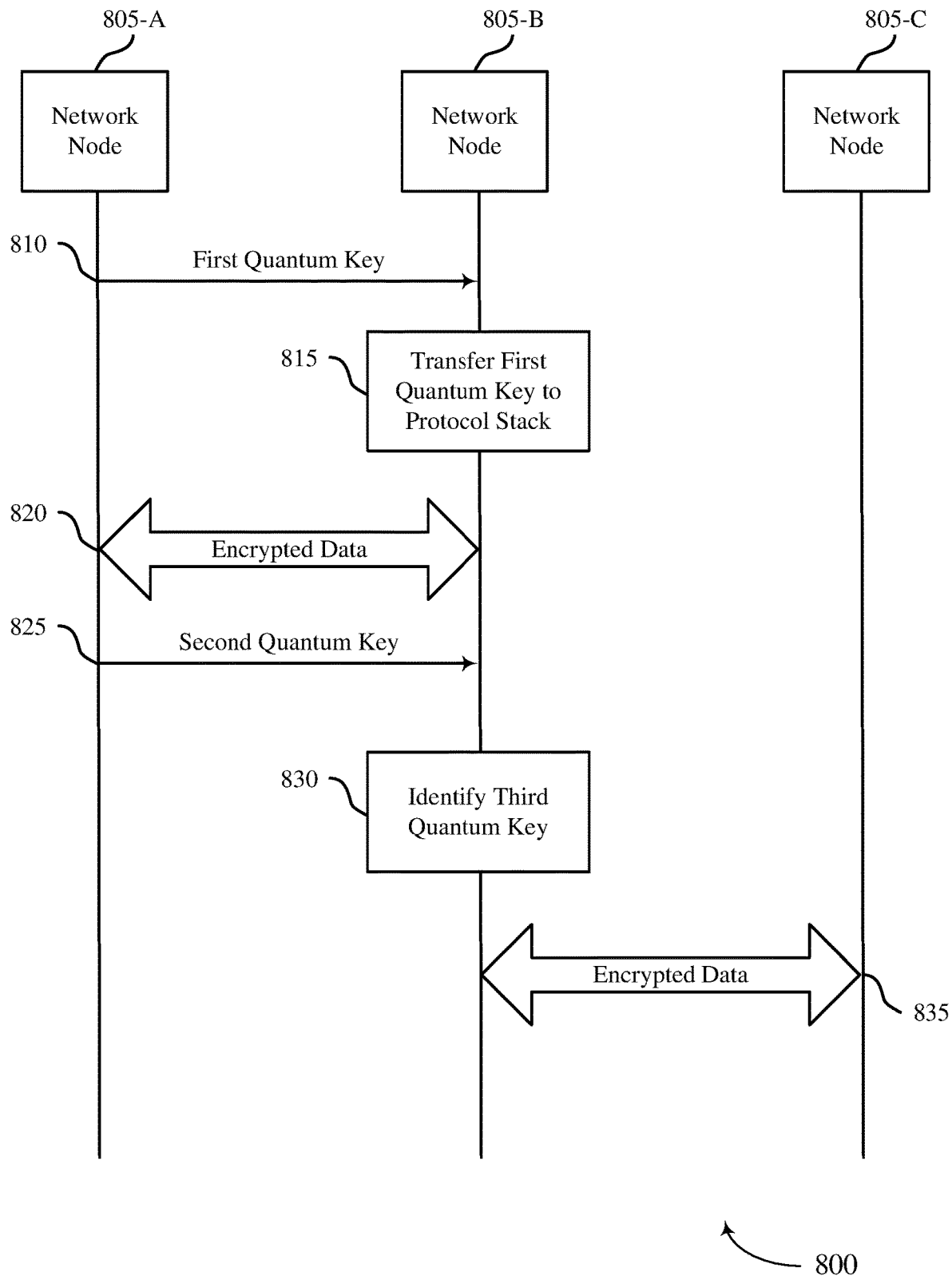
FIG. 8 illustrates an example of a process flow that supports QKD in PONs in accordance with examples as disclosed herein.

FIG. 8 illustrates an example of a process flow 800 that support QKD in a PON in accordance with various aspects of the present disclosure. The process flow 800 may be implemented by network nodes 805, which may be examples of the network nodes (e.g., the remote nodes, the central nodes) as described herein. In the following description of the process flow 800, the operations may be performed in different orders or at different times. Some operations may also be omitted from the process flow 800, and other operations may be added to the process flow 800.

At 810, the network node 805-*a* may transmit, by a QKD server, a first quantum key and a first quantum key identifier to the network node 805-*b* (e.g., via a quantum channel). The network node 805-*b* may receive the first quantum key and first quantum key identifier by a QKD client.

At 815, the network node 805-*b* may transfer the first quantum key and the first quantum key identifier from the QKD client to the protocol stack of the first network node (e.g., to an encryption protocol of the protocol stack).

At 820, the network node 805-*b* and the network node 805-*a* may communicate, by the encryption protocol of the protocol stack, encrypted data. In some cases, the data may be encrypted using the first quantum key and may include an indication of the first quantum key identifier.

At 825, the network node 805-*a* may transmit a message including a second quantum key derived from a third quantum key associated with communications between the network node 805-*a* and the network node 805-*c*.

At 830, the network node 805-*b* may identify the third quantum key based on the second quantum key and the first quantum key.

At 835, the network node 805-*b* may communicate with the network node 805-*c*, by the encryption protocol of the protocol stack, encrypted data. In some cases, the data may be encrypted using a combination (e.g., according to a predetermined or negotiated function) of the first quantum key and the third quantum key.

Figure 9:
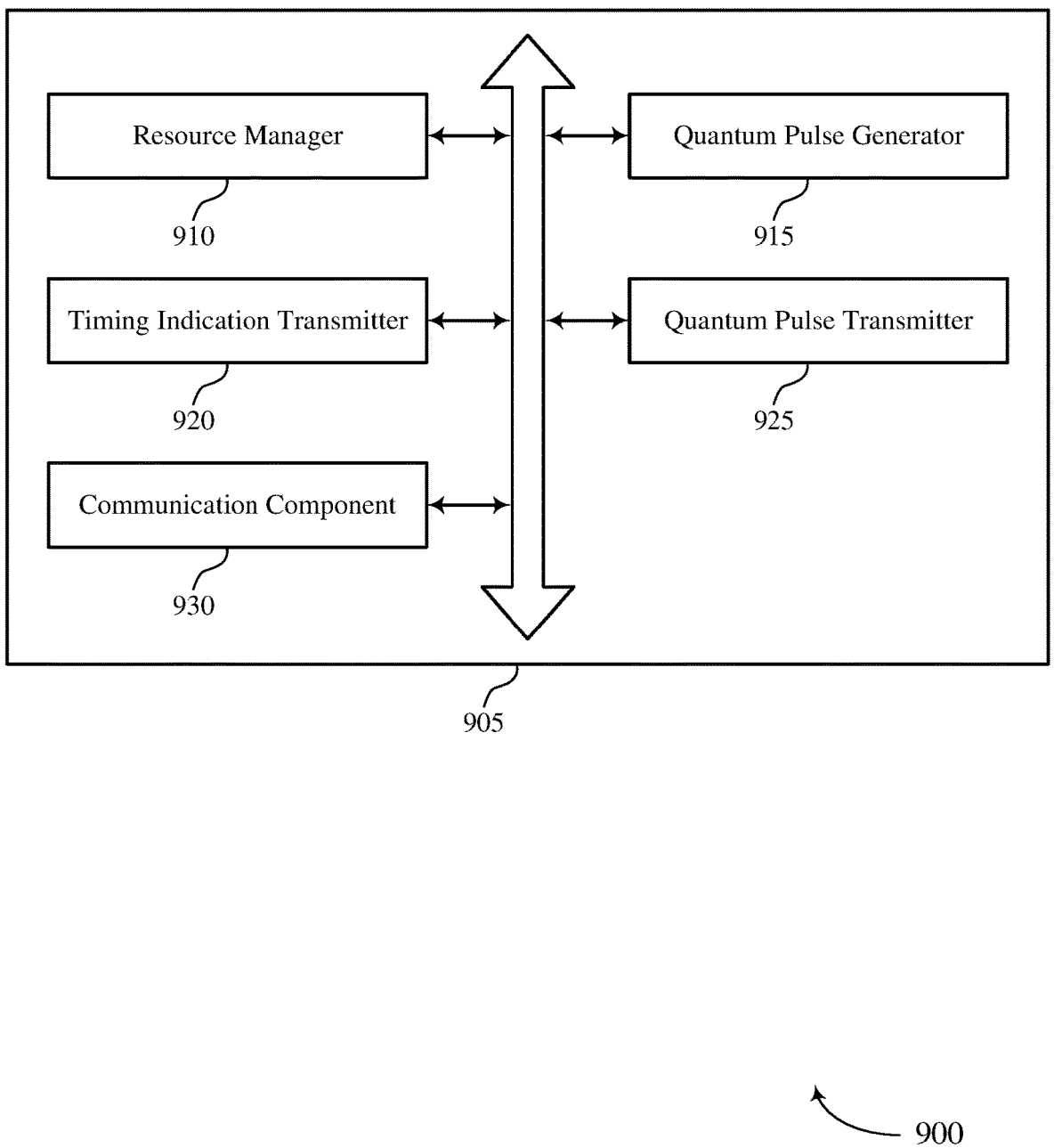
FIG. 9 shows a block diagram of a remote node that supports QKD in PONs in accordance with aspects of the present disclosure.

FIG. 9 shows a block diagram 900 of a remote node 905 that supports QKD in PONs in accordance with examples as disclosed herein. The remote node 905 may be an example of aspects of a remote node as described with reference to FIGS. 1 through 5. The remote node 905 may include a resource manager 910, a quantum pulse generator 915, a timing indication transmitter 920, a quantum pulse transmitter 925, and a communication component 930. Each of these modules may communicate, directly or indirectly, with one another (e.g., via one or more buses).

The resource manager 910 may identify, from a set of resources shared by the set of remote nodes, resources for outputting a quantum pulse indicating a quantum key for optical communications between the remote node and the central node. In some examples, the resource manager 910 may output, to the optical component, a request for time resources for outputting the quantum key. In some cases, the resource manager 910 may receive, from the optical component, an indication of the identified resources based on outputting the request for time resources. In some instances, the identified resources for outputting the quantum pulse are time division multiplexed with resources from the set of resources that are associated with the set of remote nodes. Here, the optical component may be an optical splitter. In some cases, the identified resources for outputting the quantum pulse are wavelength division multiplexed with resources from the set of resources that are associated with the set of remote nodes. Here, the optical component may be a cyclic AWG router.

The quantum pulse generator 915 may generate the quantum pulse and a timing indication of the quantum pulse based on identifying the resources. In some examples, the quantum pulse generator 915 may generate a second quantum pulse indicating a second quantum key for optical communications between the remote node and the central node.

The timing indication transmitter 920 may output, to the optical component, the timing indication of the quantum pulse.

The quantum pulse transmitter 925 may output, to the optical component using the identified resources, the quantum pulse indicating the quantum key based on outputting the timing indication of the quantum pulse. In some examples, the quantum pulse transmitter 925 may output, to the optical component after outputting the quantum pulse to the optical component, the second quantum pulse indicating the second quantum key based on outputting the timing indication, where the timing indication indicates a timing of the quantum pulse and the second quantum pulse.

The communication component 930 may communicate with the central node based on outputting the quantum pulse indicating the quantum key. In some examples, the communication component 930 may switch, from a first communication mode for communicating the quantum pulse to the central node, to a second communication mode for communicating data with the central node based on outputting the quantum pulse to the optical component, where communicating with the central node is based on the switching. In some cases, the communication component 930 may encrypt, using the quantum key, data for transmission to the central node. In some instances, the communication component 930 may output the encrypted data to the optical component. In some examples, the communication component 930 may receive encrypted data from the optical component. In some cases, the communication component 930 may decrypt, using the quantum key, the encrypted data received from the optical component.

Figure 10:
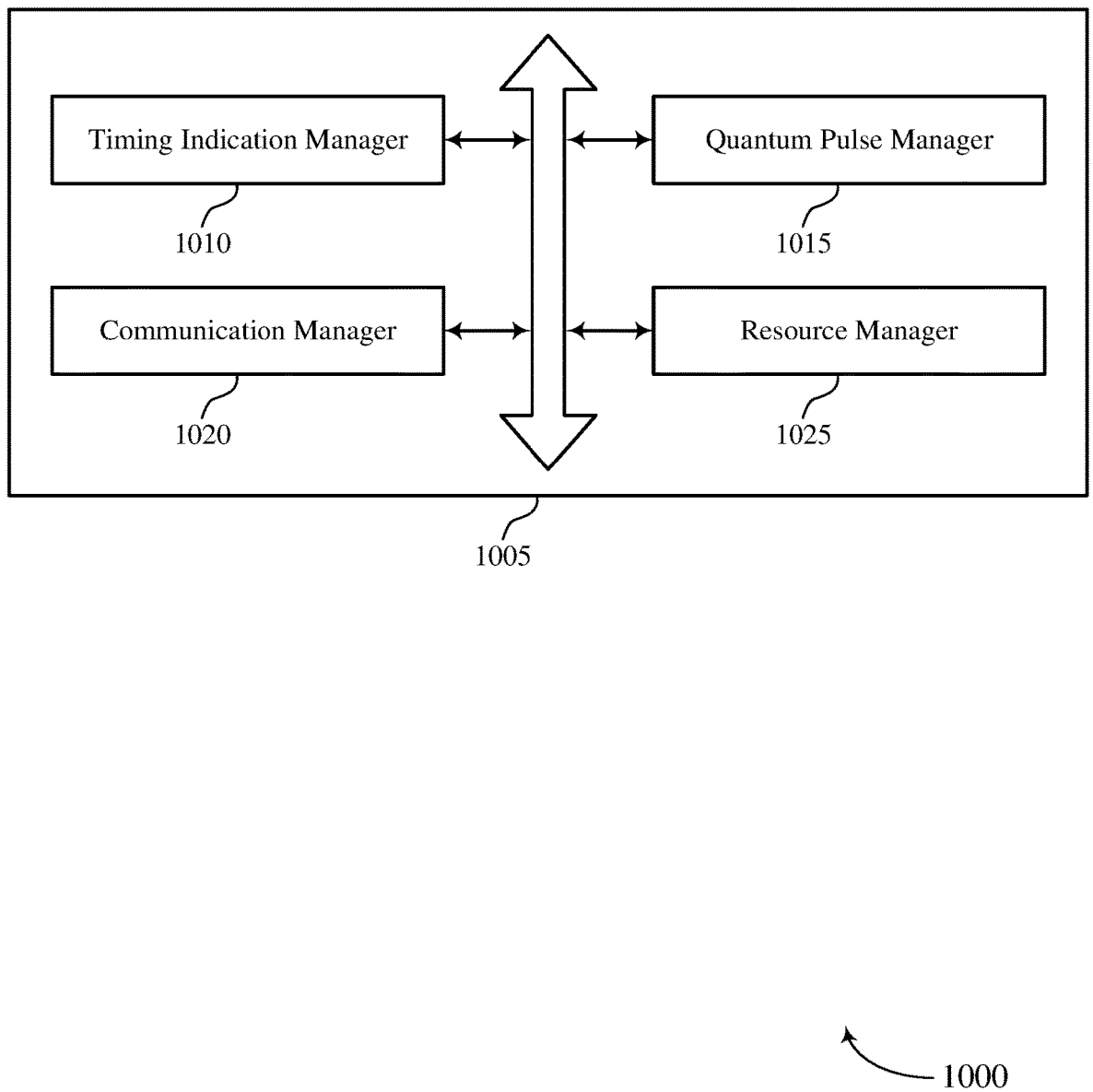
FIG. 10 shows a block diagram of a central node that supports QKD in PONs in accordance with aspects of the present disclosure.

FIG. 10 shows a block diagram 1000 of a central node 1005 that supports QKD in PONs in accordance with examples as disclosed herein. The central node 1005 may be an example of aspects of a central node as described with reference to FIGS. 1 through 5 The central node 1005 may include a timing indication manager 1010, a quantum pulse manager 1015, a communication manager 1020, and a resource manager 1025. Each of these modules may communicate, directly or indirectly, with one another (e.g., via one or more buses).

The timing indication manager 1010 may receive, from the optical component, a set of timing indications each associated with one of a set of quantum pulses each indicating a quantum key for optical communications associated with one of the set of remote nodes.

The quantum pulse manager 1015 may receive, from the optical component, the set of quantum pulses via a set of resources based on receiving the set of timing indications. In some cases, each of the set of quantum pulses are received via resources that are time division multiplexed with the resources in the set of resources. In some examples, the optical component is an optical splitter. In some instances, each of the set of quantum pulses are received via resources that are wavelength division multiplexed with resources in the set of resources. In some examples, the optical component is cyclic AWG router.

The communication manager 1020 may communicate with the set of remote nodes based on receiving the set of quantum pulses each indicating the quantum key for optical communications associated with one of the set of remote nodes. In some examples, the communication manager 1020 may switch, from a first communication mode for receiving the set of quantum pulses, to a second communication mode for communicating data with the set of remote nodes based on receiving the set of quantum pulses from the optical component, where communicating with the set of remote nodes is based on the switching. In some cases, the communication manager 1020 may identify data for transmission to one remote node of the set of remote nodes.

In some instances, the communication manager 1020 may encrypt, using the quantum key for optical communications associated with the one remote node, the data for transmission to the central node. In some examples, the communication manager 1020 may communicate the encrypted data to the one remote node via the optical component. In some cases, the communication manager 1020 may receive, from the optical component, encrypted data associated with one remote node of the set of remote nodes. In some instances, the communication manager 1020 may decrypt, using the quantum key for optical communications associated with the one remote node, the encrypted data received from the optical component.

The resource manager 1025 may receive, from the optical component, a request for time resources for one of the set of quantum pulses. In some examples, the resource manager 1025 may output, to the optical component, an indication of time resource within the set of resources for the one of the set of quantum pulses, where receiving the set of quantum pulses is based on outputting the indication.

Figure 11:
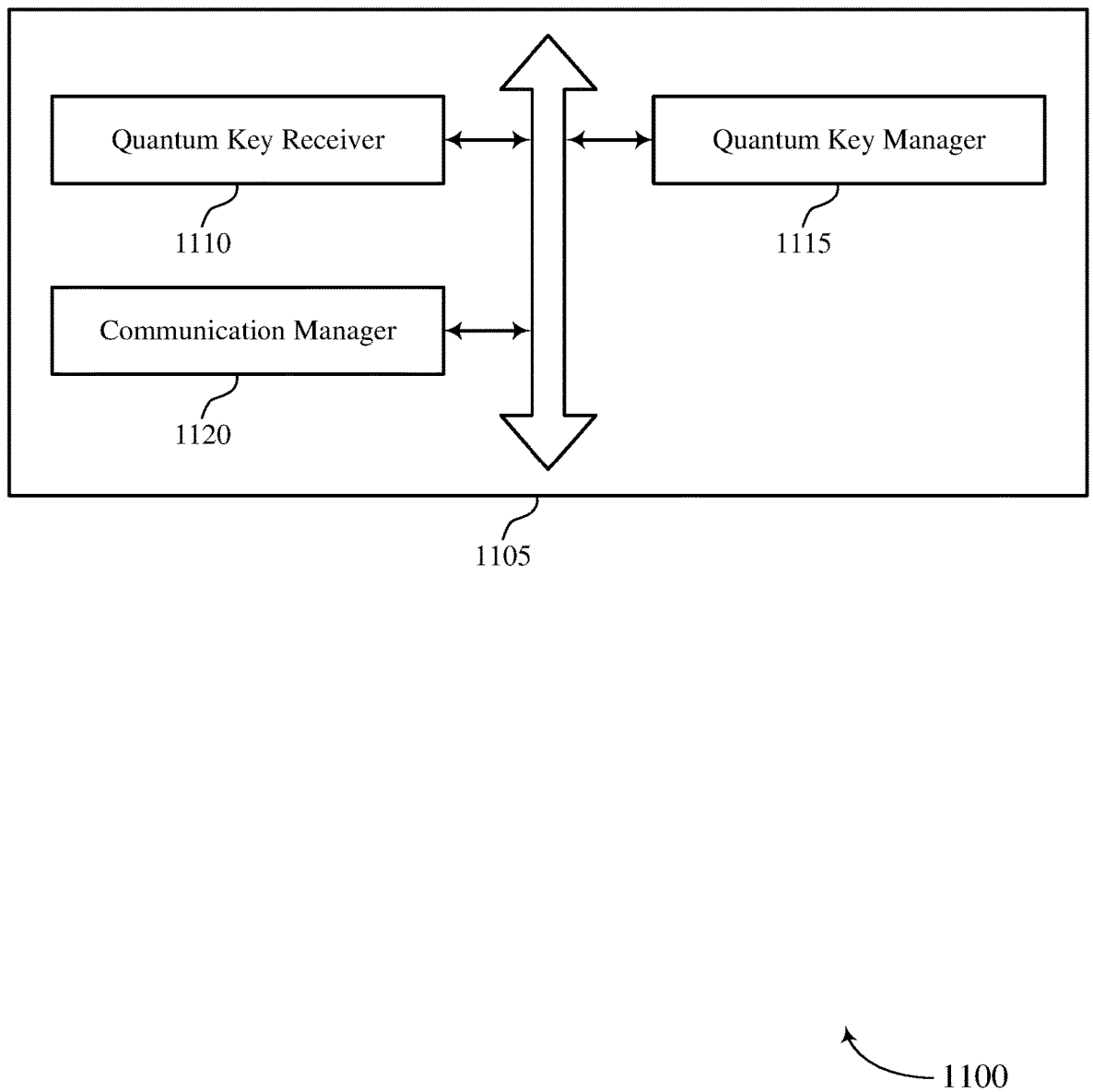
FIG. 11 shows a block diagram of a network node that supports QKD in PONs in accordance with aspects of the present disclosure.

FIG. 11 shows a block diagram 1100 of a network node 1105 that supports QKD in PONs in accordance with examples as disclosed herein. The network node 1105 may be an example of aspects of a network node as described with reference to FIGS. 1 through 8. The network node 1105 may include a quantum key receiver 1110, a quantum key manager 1115, and a communication manager 1120. Each of these modules may communicate, directly or indirectly, with one another (e.g., via one or more buses).

The quantum key receiver 1110 may receive, by the QKD client, a first quantum key and a first quantum key identifier from a second network node. In some examples, the quantum key receiver 1110 may receive, from the second network node, a message including a second quantum key derived from a third quantum key associated with communications between the second network node and a third network node.

The quantum key manager 1115 may transfer the first quantum key and the first quantum key identifier from the QKD client of the first network node to the protocol stack of the first network node. In some examples, the quantum key manager 1115 may identify the third quantum key based on the second quantum key and the first quantum key. In some cases, the quantum key manager 1115 may transfer the first quantum key and the first quantum key identifier from the QKD client of the first network node to a key management layer of the first network node. In some instances, the quantum key manager 1115 may store the first quantum key and the first quantum key identifier at a server associated with the key management layer, where communicating encrypted data with the second network node is based on the storing. In some examples, the quantum key manager 1115 may transmit, by a key management layer of the first network node, a request for the first quantum key to a corresponding key management layer of the second network node, where receiving the first quantum key by the QKD client of the first network node is based on transmitting the request.

The communication manager 1120 may communicate, by an encryption protocol of the protocol stack, encrypted data with the second network node, where the encrypted data is encrypted using the first quantum key and includes an indication of the first quantum key identifier. In some examples, the communication manager 1120 may communicate, by the encryption protocol of the protocol stack, second encrypted data with the third network node, where the second encrypted data is encrypted using the first quantum key and the third quantum key. In some cases, the communication manager 1120 may identify data for transmission to the second network node. In some instances, the communication manager 1120 may encrypt, by the encryption protocol of the protocol stack, the data for transmission to the second network node using the first quantum key.

In some examples, the communication manager 1120 may transmit, by the encryption protocol of the protocol stack, the encrypted data and the indication of the first quantum key identifier to the second network node. In some cases, receiving, by the encryption protocol of the protocol stack, encrypted data from the second network node, where the encrypted data includes the indication of the first quantum key identifier. In some instances, the communication manager 1120 may retrieve, by the encryption protocol of the protocol stack, the first quantum key from a server associated with a key management layer of the first network node based on the indication of the first quantum key identifier. In some examples, the communication manager 1120 may decrypt, by the encryption protocol of the protocol stack, the encrypted data using the first quantum key based on retrieving the first quantum key.

Figure 12:
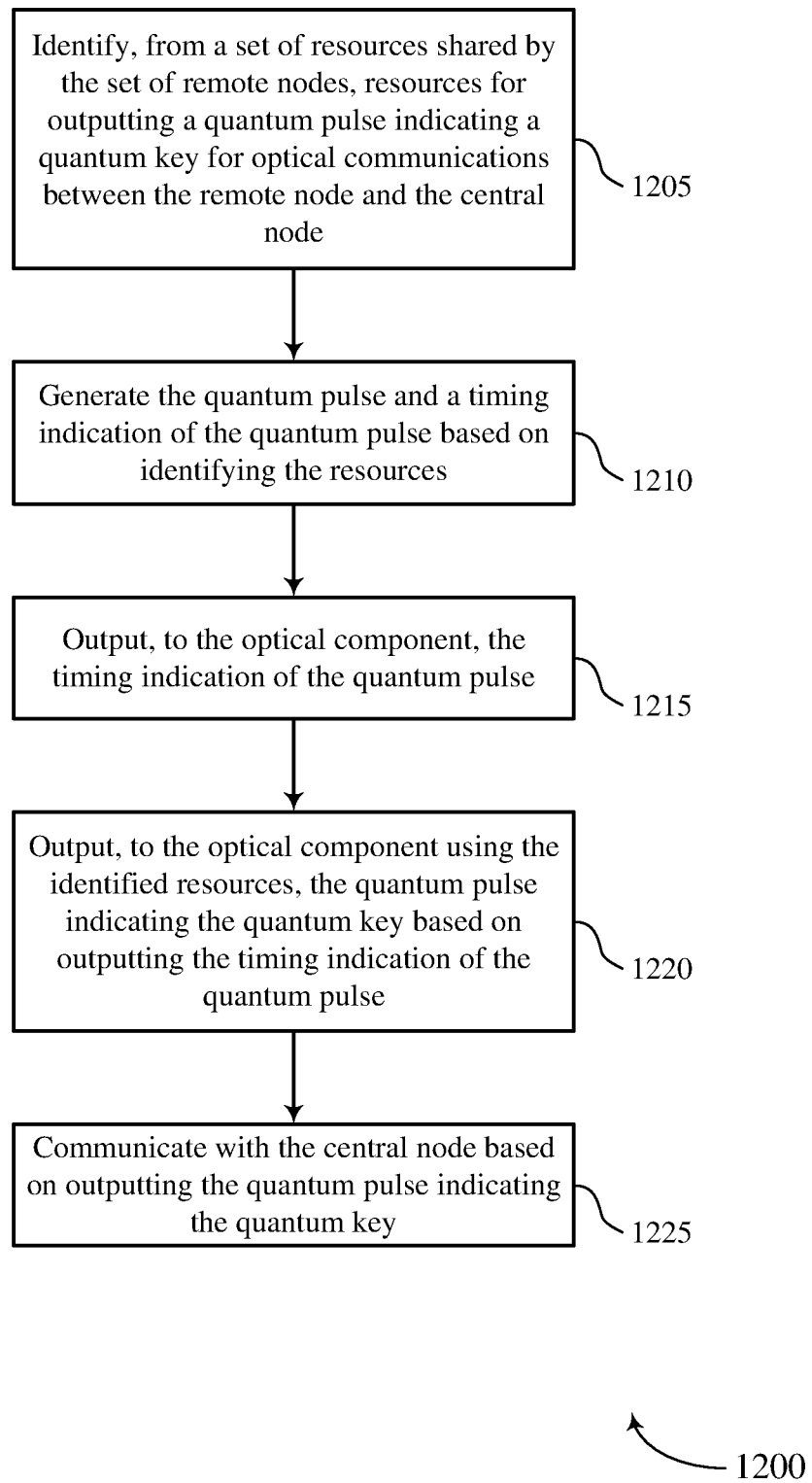
FIGS. 12 through 15 show flowcharts illustrating a method or methods that support QKD in PONs in accordance with examples as disclosed herein.

FIG. 12 shows a flowchart illustrating a method or methods 1200 that supports QKD in PONs in accordance with aspects of the present disclosure. The operations of method 1200 may be implemented by a remote node or its components as described herein. For example, the operations of method 1200 may be performed by a remote node as described with reference to FIG. 9. In some examples, a remote node may execute a set of instructions to control the functional elements of the remote node to perform the described functions. Additionally or alternatively, a remote node may perform aspects of the described functions using special-purpose hardware.

At 1205, the remote node may identify, from a set of resources shared by the set of remote nodes, resources for outputting a quantum pulse indicating a quantum key for optical communications between the remote node and the central node. The operations of 1205 may be performed according to the methods described herein. In some examples, aspects of the operations of 1205 may be performed by a resource manager as described with reference to FIG. 9.

At 1210, the remote node may generate the quantum pulse and a timing indication of the quantum pulse based on identifying the resources. The operations of 1210 may be performed according to the methods described herein. In some examples, aspects of the operations of 1210 may be performed by a quantum pulse generator as described with reference to FIG. 9.

At 1215, the remote node may output, to the optical component, the timing indication of the quantum pulse. The operations of 1215 may be performed according to the methods described herein. In some examples, aspects of the operations of 1215 may be performed by a timing indication transmitter as described with reference to FIG. 9.

At 1220, the remote node may output, to the optical component using the identified resources, the quantum pulse indicating the quantum key based on outputting the timing indication of the quantum pulse. The operations of 1220 may be performed according to the methods described herein. In some examples, aspects of the operations of 1220 may be performed by a quantum pulse transmitter as described with reference to FIG. 9.

At 1225, the remote node may communicate with the central node based on outputting the quantum pulse indicating the quantum key. The operations of 1225 may be performed according to the methods described herein. In some examples, aspects of the operations of 1225 may be performed by a communication component as described with reference to FIG. 9.

Figure 13:
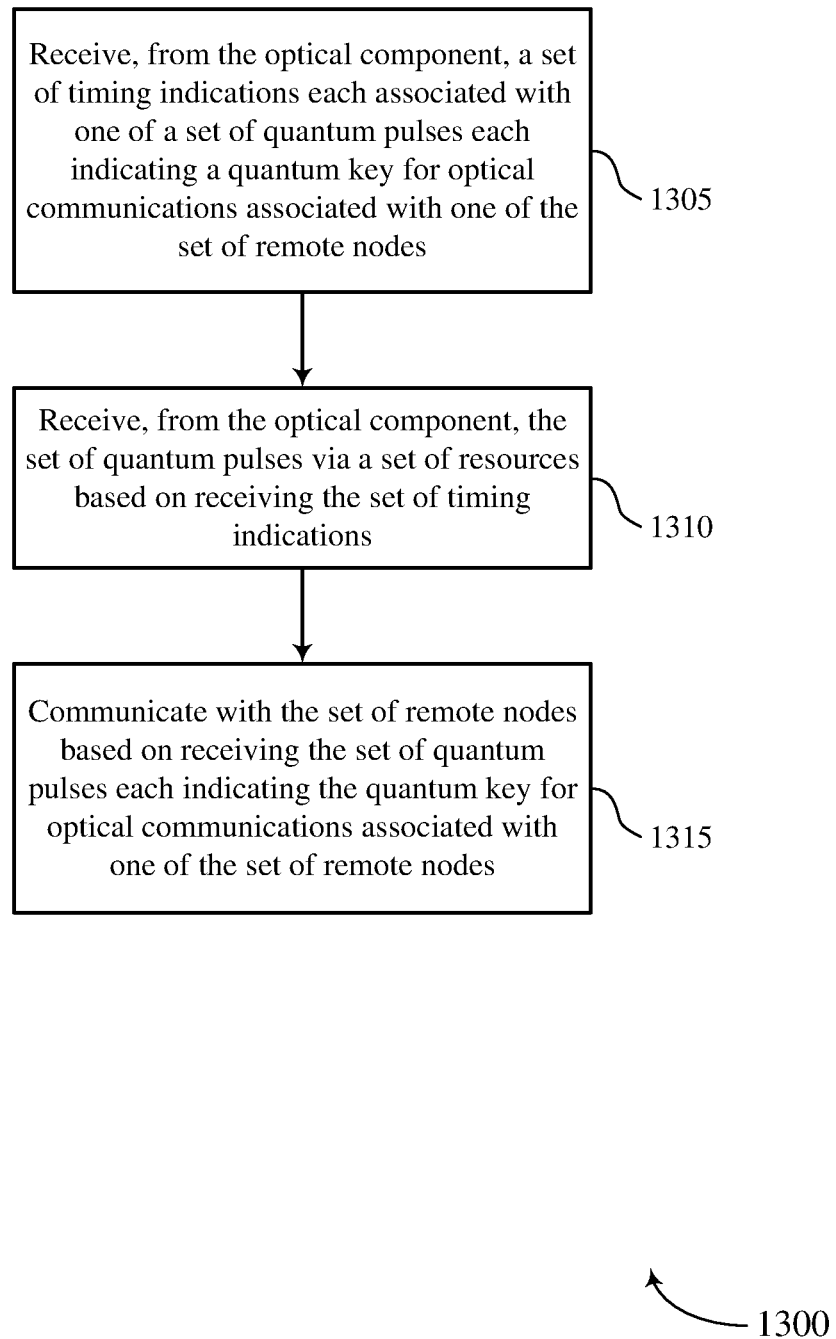

FIG. 13 shows a flowchart illustrating a method or methods 1300 that supports QKD in PONs in accordance with aspects of the present disclosure. The operations of method 1300 may be implemented by a central node or its components as described herein. For example, the operations of method 1300 may be performed by a central node as described with reference to FIG. 10. In some examples, a central node may execute a set of instructions to control the functional elements of the central node to perform the described functions. Additionally or alternatively, a central node may perform aspects of the described functions using special-purpose hardware.

At 1305, the central node may receive, from the optical component, a set of timing indications each associated with one of a set of quantum pulses each indicating a quantum key for optical communications associated with one of the set of remote nodes. The operations of 1305 may be performed according to the methods described herein. In some examples, aspects of the operations of 1305 may be performed by a timing indication manager as described with reference to FIG. 10.

At 1310, the central node may receive, from the optical component, the set of quantum pulses via a set of resources based on receiving the set of timing indications. The operations of 1310 may be performed according to the methods described herein. In some examples, aspects of the operations of 1310 may be performed by a quantum pulse manager as described with reference to FIG. 10.

At 1315, the central node may communicate with the set of remote nodes based on receiving the set of quantum pulses each indicating the quantum key for optical communications associated with one of the set of remote nodes. The operations of 1315 may be performed according to the methods described herein. In some examples, aspects of the operations of 1315 may be performed by a communication manager as described with reference to FIG. 10.

Figure 14:
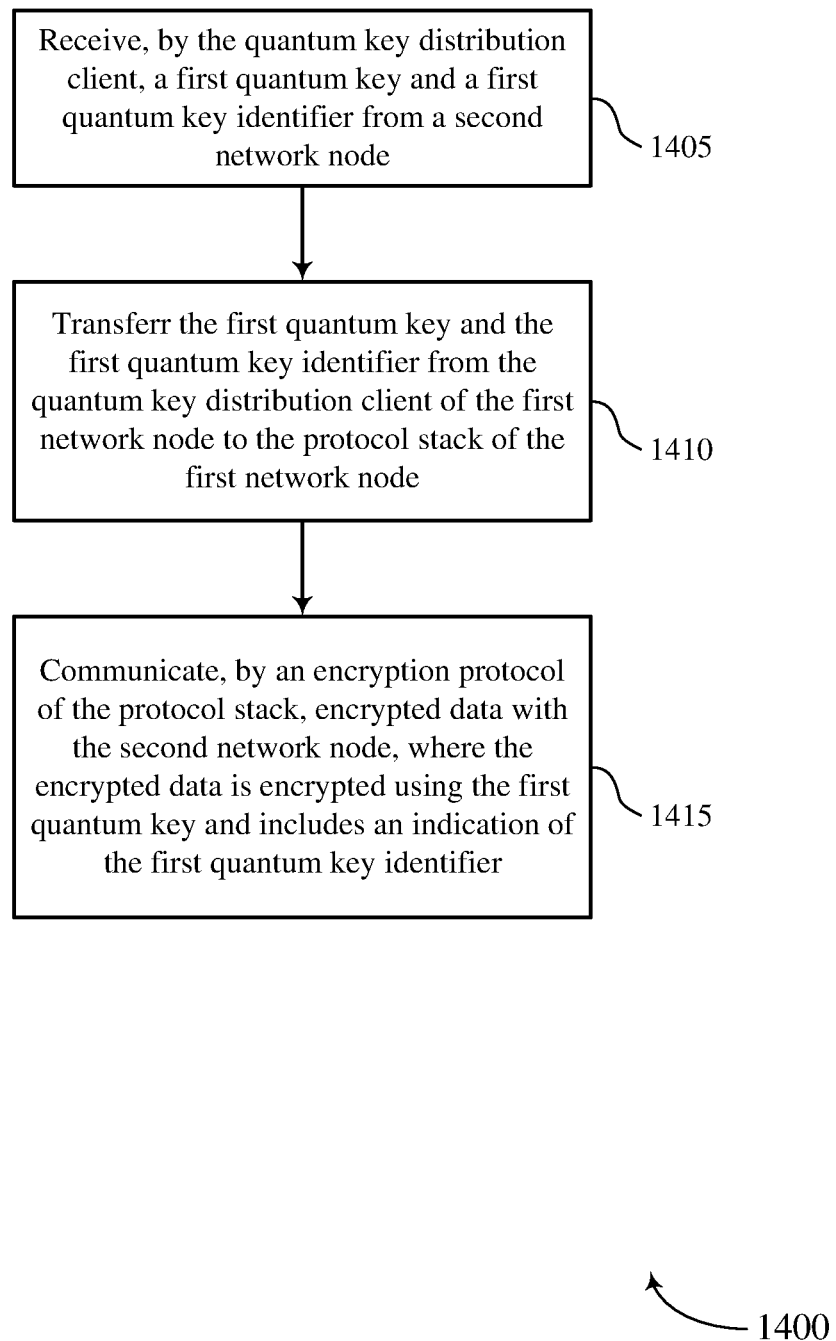

FIG. 14 shows a flowchart illustrating a method or methods 1400 that supports QKD in PONs in accordance with aspects of the present disclosure. The operations of method 1400 may be implemented by a network node or its components as described herein. For example, the operations of method 1400 may be performed by a network node as described with reference to FIG. 11. In some examples, a network node may execute a set of instructions to control the functional elements of the network node to perform the described functions. Additionally or alternatively, a network node may perform aspects of the described functions using special-purpose hardware.

At 1405, the network node may receive, by the QKD client, a first quantum key and a first quantum key identifier from a second network node. The operations of 1405 may be performed according to the methods described herein. In some examples, aspects of the operations of 1405 may be performed by a quantum key receiver as described with reference to FIG. 11.

At 1410, the network node may transfer the first quantum key and the first quantum key identifier from the QKD client of the first network node to the protocol stack of the first network node. The operations of 1410 may be performed according to the methods described herein. In some examples, aspects of the operations of 1410 may be performed by a quantum key manager as described with reference to FIG. 11.

At 1415, the network node may communicate, by an encryption protocol of the protocol stack, encrypted data with the second network node, where the encrypted data is encrypted using the first quantum key and includes an indication of the first quantum key identifier. The operations of 1415 may be performed according to the methods described herein. In some examples, aspects of the operations of 1415 may be performed by a communication manager as described with reference to FIG. 11.

Figure 15:
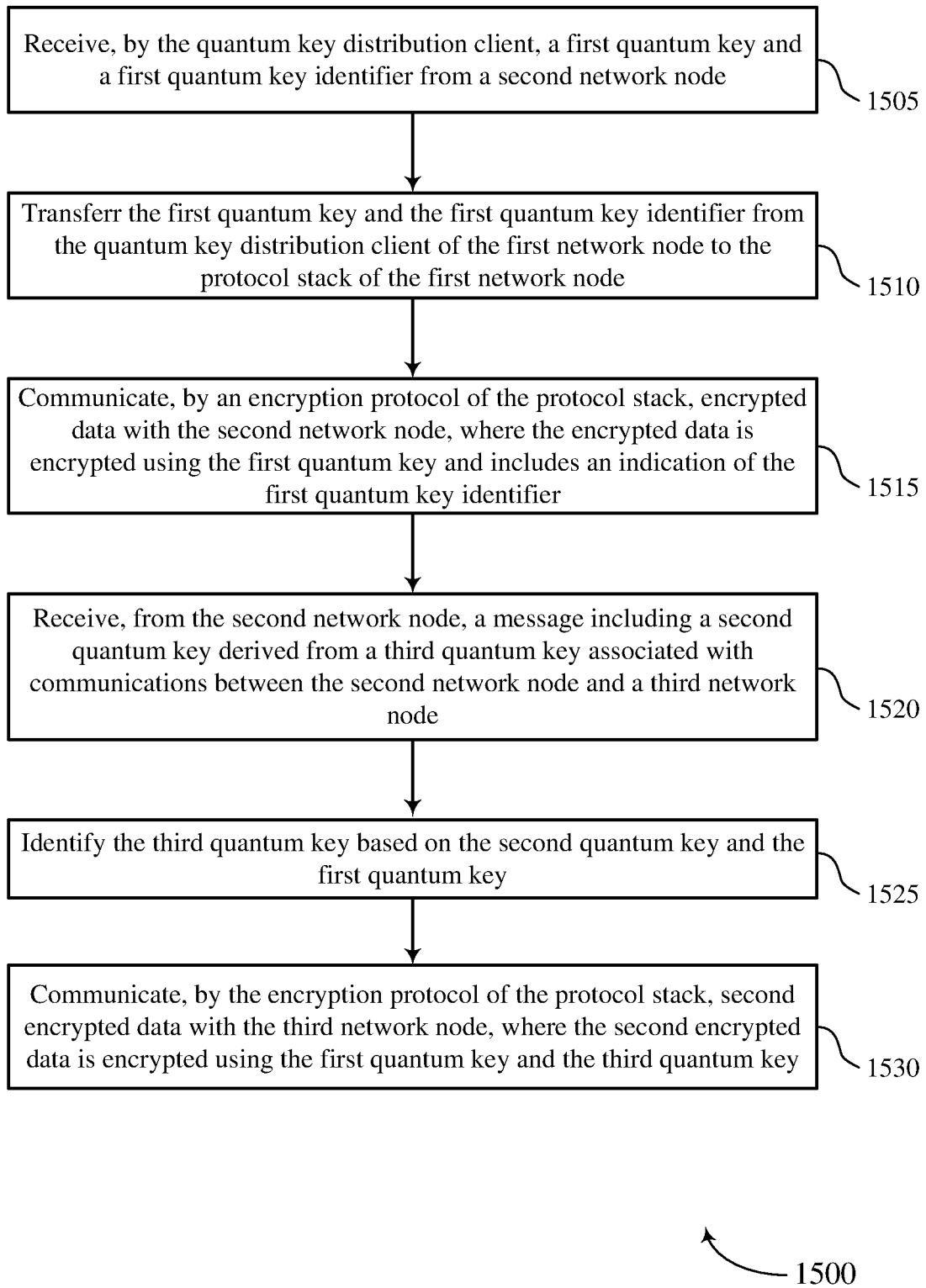

FIG. 15 shows a flowchart illustrating a method or methods 1500 that supports QKD in PONs in accordance with aspects of the present disclosure. The operations of method 1500 may be implemented by a network node or its components as described herein. For example, the operations of method 1500 may be performed by a network node as described with reference to FIG. 11. In some examples, a network node may execute a set of instructions to control the functional elements of the network node to perform the described functions. Additionally or alternatively, a network node may perform aspects of the described functions using special-purpose hardware.

At 1505, the network node may receive, by the QKD client, a first quantum key and a first quantum key identifier from a second network node. The operations of 1505 may be performed according to the methods described herein. In some examples, aspects of the operations of 1505 may be performed by a quantum key receiver as described with reference to FIG. 11.

At 1510, the network node may transfer the first quantum key and the first quantum key identifier from the QKD client of the first network node to the protocol stack of the first network node. The operations of 1510 may be performed according to the methods described herein. In some examples, aspects of the operations of 1510 may be performed by a quantum key manager as described with reference to FIG. 11.

At 1515, the network node may communicate, by an encryption protocol of the protocol stack, encrypted data with the second network node, where the encrypted data is encrypted using the first quantum key and includes an indication of the first quantum key identifier. The operations of 1515 may be performed according to the methods described herein. In some examples, aspects of the operations of 1515 may be performed by a communication manager as described with reference to FIG. 11.

At 1520, the network node may receive, from the second network node, a message including a second quantum key derived from a third quantum key associated with communications between the second network node and a third network node. The operations of 1520 may be performed according to the methods described herein. In some examples, aspects of the operations of 1520 may be performed by a quantum key receiver as described with reference to FIG. 11.

At 1525, the network node may identify the third quantum key based on the second quantum key and the first quantum key. The operations of 1525 may be performed according to the methods described herein. In some examples, aspects of the operations of 1525 may be performed by a quantum key manager as described with reference to FIG. 11.

At 1530, the network node may communicate, by the encryption protocol of the protocol stack, second encrypted data with the third network node, where the second encrypted data is encrypted using the first quantum key and the third quantum key. The operations of 1530 may be performed according to the methods described herein. In some examples, aspects of the operations of 1530 may be performed by a communication manager as described with reference to FIG. 11.

It should be noted that the methods described herein are possible implementations, and that the operations and the steps may be rearranged or otherwise modified and that other implementations are possible. Furthermore, portions from two or more of the methods may be combined.

The various illustrative blocks and modules described in connection with the disclosure herein may be implemented or performed with a general-purpose processor, a digital signal processor (DSP), an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus configured for optical communications with a central node configured for communications with a plurality of remote nodes via an optical component coupled with the central node and the plurality of remote nodes, the plurality of remote nodes including the apparatus, the apparatus comprising:

a quantum key distribution transmitter configured to:
identify resources from a set of resources shared by the plurality of remote nodes for outputting a quantum pulse indicating a quantum key for optical communications associated with the apparatus; and
generate the quantum pulse based at least in part on the identifying;
a synchronization pulse generator configured to generate a timing indication of the quantum pulse indicating the quantum key; and
a filter coupled with the quantum key distribution transmitter and the synchronization pulse generator and configured to output, to the optical component, the timing indication of the quantum pulse and the quantum pulse indicating the quantum key using the identified resources.

2. The apparatus of claim 1, wherein:
the identified resources for outputting the quantum pulse are time division multiplexed with resources from the set of resources that are associated with the plurality of remote nodes; and
the optical component is an optical splitter.

3. The apparatus of claim 1, wherein:
the identified resources for outputting the quantum pulse are wavelength division multiplexed with resources from the set of resources that are associated with the plurality of remote nodes; and
the optical component is cyclic arrayed waveguide grating router.

4. The apparatus of claim 1, further comprising an optical switch that is configured to selectively couple the filter with the quantum key distribution transmitter and the synchronization pulse generator or couple the filter with a data transmitter and a data receiver.

5. The apparatus of claim 1, further comprising a data transmitter coupled with the filter and configured to:
identify data for transmission to the central node;
encrypt, using the quantum key, the data for transmission to the central node; and
communicate the encrypted data to the filter, wherein the filter is further configured to output the encrypted data to the optical component.

6. The apparatus of claim 1, wherein:
the filter is further configured to receive encrypted data from the optical component; and
the apparatus further comprises a data receiver coupled with the filter and configured to decrypt the encrypted data using the quantum key.

7. The apparatus of claim 1, wherein the filter is a coarse wavelength division multiplexer.

8. An apparatus configured for optical communications with a plurality of remote nodes via an optical component coupled with the apparatus and the plurality of remote nodes, the apparatus comprising:
a quantum key distribution receiver configured to receive, from a filter of the apparatus via a set of resources, a plurality of quantum pulses each indicating a quantum key for optical communications associated with one of the plurality of remote nodes,
a synchronization pulse receiver configured to receive, from the filter, a plurality of timing indications each associated with one of the plurality of quantum pulses, wherein the quantum key distribution receiver is configured to receive each of the plurality of quantum pulses based at least in part on the plurality of timing indications, and
the filter coupled with the quantum key distribution receiver and the synchronization pulse receiver and configured to:
receive, from the optical component, the plurality of quantum pulses and the plurality of timing indications;
communicate the plurality of quantum pulses to the quantum key distribution receiver; and
communicate the plurality of timing indications to the synchronization pulse receiver.

9. The apparatus of claim 8, wherein:
each of the plurality of quantum pulses are received via resources that are time division multiplexed with the resources in the set of resources; and
the optical component is an optical splitter.

10. The apparatus of claim 8, wherein:
each of the plurality of quantum pulses are received via resources that are wavelength division multiplexed with resources in the set of resources; and
the optical component is cyclic arrayed waveguide grating router.

11. The apparatus of claim 10, wherein:
the filter is configured to receive the plurality of quantum pulses from the optical component via a first fiber; and
the filter is configured to receive the plurality of timing indications from the optical component via a second fiber different from the first fiber.

12. The apparatus of claim 8, further comprising a gate coupled with the quantum key distribution receiver and configured to selectively couple the quantum key distribution receiver with the filter based at least in part on the plurality of timing indications.

13. The apparatus of claim 8, further comprising an optical switch that is configured to selectively couple the filter with the quantum key distribution receiver and the synchronization pulse receiver or couple the filter with a data transmitter and a data receiver.

14. The apparatus of claim 8, further comprising a narrowband optical filter coupled with the filter and the quantum key distribution receiver and configured to communicate the plurality of quantum pulses from the filter to the quantum key distribution receiver.

15. The apparatus of claim 8, further comprising a data transmitter coupled with the filter and configured to:
identify data for transmission to one remote node of the plurality of remote nodes;
encrypt, using the quantum key for optical communications associated with the one remote node, the data for transmission to the one remote node; and
communicate the encrypted data to the filter, wherein the filter is further configured to output the encrypted data to the optical component.

16. The apparatus of claim 8, wherein:
the filter is further configured to receive, from the optical component, encrypted data associated with one remote node of the plurality of remote nodes; and
the apparatus further comprises a data receiver coupled with the filter and configured to decrypt the encrypted data using the quantum key for optical communications associated with the one remote node.

17. The apparatus of claim 8, wherein the quantum key distribution receiver comprises a single photon detector.

18. The apparatus of claim 8, wherein the filter is a coarse wavelength division multiplexer.

* * * * *